(12) United States Patent
Kim

(10) Patent No.: US 9,223,475 B1
(45) Date of Patent: Dec. 29, 2015

(54) BOOKMARK NAVIGATION USER INTERFACE

(75) Inventor: John T. Kim, La Canada, CA (US)

(73) Assignee: Amazon Technologies, Inc., Seattle, WA (US)

( * ) Notice: Subject to any disclaimer, the term of this patent is extended or adjusted under 35 U.S.C. 154(b) by 381 days.

(21) Appl. No.: 12/827,369

(22) Filed: Jun. 30, 2010

(51) Int. Cl.
*G06F 3/048* (2013.01)
*G06F 3/0483* (2013.01)
*G06F 3/0488* (2013.01)

(52) U.S. Cl.
CPC ............ *G06F 3/0483* (2013.01); *G06F 3/0488* (2013.01); *G06F 3/04883* (2013.01)

(58) Field of Classification Search
CPC .............. G06F 3/04883; G06F 3/0488; G06F 3/04886; G06F 3/0485; G06F 2203/04808; G06F 3/0481; G06F 3/0483; G06F 15/0291
USPC ......................................................... 715/702
See application file for complete search history.

(56) References Cited

U.S. PATENT DOCUMENTS

| | | | |
|---|---|---|---|
| 4,820,167 A | | 4/1989 | Nobles et al. |
| 5,252,951 A | * | 10/1993 | Tannenbaum et al. ........ 345/156 |
| 5,371,846 A | | 12/1994 | Bates |
| 5,392,387 A | | 2/1995 | Fitzpatrick et al. |
| 5,463,725 A | | 10/1995 | Henckel et al. |
| 5,802,516 A | * | 9/1998 | Shwarts et al. |
| 5,825,349 A | | 10/1998 | Meier et al. |
| 5,847,698 A | | 12/1998 | Reavey et al. |
| 6,064,384 A | * | 5/2000 | Ho ................................ 715/839 |
| 6,072,476 A | | 6/2000 | Harada et al. |
| 6,229,502 B1 | | 5/2001 | Schwab |
| 6,331,867 B1 | | 12/2001 | Eberhard et al. |
| 6,405,131 B1 | | 6/2002 | Barton |
| 6,766,332 B2 | * | 7/2004 | Miyazaki et al. |
| 6,820,111 B1 | | 11/2004 | Rubin et al. |
| 6,966,030 B2 | | 11/2005 | Ashford et al. |
| 7,002,558 B2 | * | 2/2006 | Keely et al. .................... 345/179 |
| 7,458,014 B1 | * | 11/2008 | Rubin et al. ................... 715/229 |
| 7,594,187 B2 | * | 9/2009 | Baird et al. .................... 715/805 |
| 7,814,408 B1 | | 10/2010 | Dunietz et al. |
| 8,018,431 B1 | | 9/2011 | Zehr et al. |
| 8,126,878 B2 | | 2/2012 | Krasnow |
| 8,347,232 B1 | | 1/2013 | Prud'Hommeaux et al. |
| 2001/0024195 A1 | | 9/2001 | Hayakawa |
| 2002/0019950 A1 | | 2/2002 | Huffman et al. |
| 2002/0059322 A1 | | 5/2002 | Miyazaki et al. |
| 2002/0083101 A1 | | 6/2002 | Card et al. |

(Continued)

OTHER PUBLICATIONS

Eick. Stephen G. Data visualization sliders. In Proceedings of the 7th annual ACM symposium on User interface software and technology (UIST '94). ACM, New York, NY, USA, 119-120. DOI=10.1145/192426.192472 . Nov. 1994.*

(Continued)

*Primary Examiner* — Amy M Levy
(74) *Attorney, Agent, or Firm* — Lee & Hayes, PLLC

(57) ABSTRACT

A user interface for a touch-screen display of an electronic book reader device is described. The user interface has a bookmark feature designed to facilitate navigation through bookmarked locations in digital content items, such as electronic books, in response to use input via the touch-screen display. Further, the user interface provides a split progress indicator with separate portions presented in different areas of the display. The portions of the indicator are configured to represent proportions of content that comes before and after the current location being displayed.

41 Claims, 19 Drawing Sheets

(56) References Cited

U.S. PATENT DOCUMENTS

| | | | |
|---|---|---|---|
| 2002/0116420 A1 | 8/2002 | Allam et al. | |
| 2002/0140717 A1 | 10/2002 | Ho | |
| 2002/0182578 A1 | 12/2002 | Rachman et al. | |
| 2002/0184189 A1* | 12/2002 | Hay et al. | 707/1 |
| 2003/0014674 A1 | 1/2003 | Huffman et al. | |
| 2003/0210226 A1* | 11/2003 | Ho et al. | 345/156 |
| 2004/0070633 A1 | 4/2004 | Nakamura et al. | |
| 2004/0164975 A1* | 8/2004 | Ho et al. | 345/204 |
| 2004/0194014 A1 | 9/2004 | Anwar | |
| 2004/0236774 A1* | 11/2004 | Baird et al. | 707/100 |
| 2005/0005246 A1 | 1/2005 | Card et al. | |
| 2005/0097135 A1 | 5/2005 | Epperson et al. | |
| 2006/0013557 A1 | 1/2006 | Poslinski | |
| 2006/0020966 A1 | 1/2006 | Poslinski | |
| 2006/0026521 A1* | 2/2006 | Hotelling et al. | 715/702 |
| 2006/0029296 A1 | 2/2006 | King et al. | |
| 2006/0045470 A1 | 3/2006 | Poslinski et al. | |
| 2006/0048184 A1 | 3/2006 | Poslinski et al. | |
| 2006/0082540 A1* | 4/2006 | Prior | 345/156 |
| 2006/0123329 A1 | 6/2006 | Steen et al. | |
| 2006/0190833 A1 | 8/2006 | SanGiovanni et al. | |
| 2006/0194181 A1 | 8/2006 | Rosenberg | |
| 2006/0230340 A1 | 10/2006 | Parsons et al. | |
| 2006/0248470 A1 | 11/2006 | Lee et al. | |
| 2006/0271870 A1 | 11/2006 | Anwar | |
| 2006/0288842 A1* | 12/2006 | Sitrick et al. | 84/477 R |
| 2007/0016565 A1 | 1/2007 | Evans et al. | |
| 2007/0083911 A1 | 4/2007 | Madden et al. | |
| 2007/0192157 A1 | 8/2007 | Gooch | |
| 2007/0277126 A1 | 11/2007 | Park et al. | |
| 2008/0052945 A1 | 3/2008 | Matas et al. | |
| 2008/0055269 A1 | 3/2008 | Lemay et al. | |
| 2008/0104547 A1* | 5/2008 | Morita et al. | 715/863 |
| 2008/0168382 A1 | 7/2008 | Louch et al. | |
| 2008/0207188 A1 | 8/2008 | Ahn et al. | |
| 2008/0222552 A1 | 9/2008 | Batarseh et al. | |
| 2008/0243828 A1 | 10/2008 | Reztlaff et al. | |
| 2008/0259057 A1 | 10/2008 | Brons | |
| 2008/0288894 A1 | 11/2008 | Han et al. | |
| 2008/0313722 A1* | 12/2008 | Cho et al. | 726/7 |
| 2009/0037813 A1* | 2/2009 | Newman et al. | 715/702 |
| 2009/0058822 A1 | 3/2009 | Chaudhri | |
| 2009/0102805 A1* | 4/2009 | Meijer et al. | 345/173 |
| 2009/0132234 A1 | 5/2009 | Weikel | |
| 2009/0219255 A1 | 9/2009 | Woolley et al. | |
| 2009/0256947 A1 | 10/2009 | Ciurea et al. | |
| 2009/0271703 A1* | 10/2009 | Chu et al. | 715/702 |
| 2010/0005381 A1 | 1/2010 | Safars et al. | |
| 2010/0011315 A1 | 1/2010 | Araki | |
| 2010/0105443 A1* | 4/2010 | Vaisanen | 455/566 |
| 2010/0129782 A1 | 5/2010 | Milne et al. | |
| 2010/0161653 A1 | 6/2010 | Krasnow | |
| 2010/0211866 A1 | 8/2010 | Nicholas et al. | |
| 2010/0325573 A1 | 12/2010 | Estrada et al. | |

OTHER PUBLICATIONS

Moshazu, Progress Bar Right to Left, http://bytes.com/topic/visual-basic-net/answers/449060-progress-bar-right-left, Jan. 24, 2006, 3 pages.

Office action for U.S. Appl. No. 12/827,763, mailed on Oct. 9, 2012, Kim, "Chapter Navigation User Interface", 36 pages.

Sony Corporation, User's Guide PRS-600 Digital Book Reader, http://store.sony.com/wcsstore/SonyStyleStorefrontAssetStore/pdf/warranty/SEL-asset-166216.pdf, 2009, 4 pages.

Unknown, Ambling Book Player, http://web.archive/org/web/2010032318432/http:/amblingbookplayer.com, 2009, 2 pages.

Unknown, Kindle User's Guide, for Kindle 1, released in 2007, <http://s3.amazonaws.com/kindle/Kindle_User_Guide.pdf>, 89 pages.

Office action for U.S. Appl. No. 12/827,763, mailed on Apr. 24, 2013, Kim, "Chapter Navigation User Interface," 47 pages.

Office Action for U.S. Appl. No. 12/827,763, mailed on Feb. 4, 2014, John T. Kim, "Chapter Navigation User Interface", 18 pages.

Sony, User's Guide PRS-600 Digital Book Reader, Dec. 11, 2009, Sony, p. 109.

Office action for U.S. Appl. No. 12/827,763, mailed on Sep. 11, 2014, Kim, "Chapter Navigation User Interface", 42 pages.

* cited by examiner

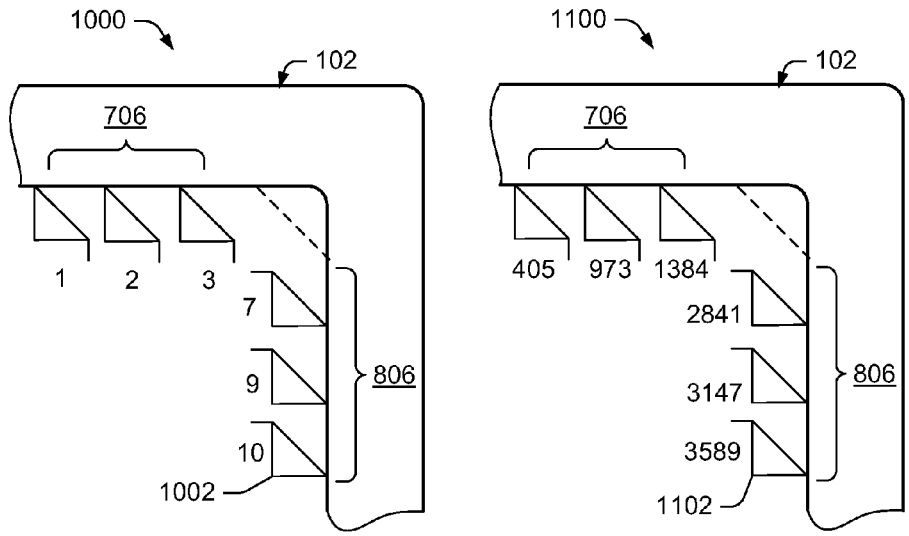
FIG. 10
FIG. 11
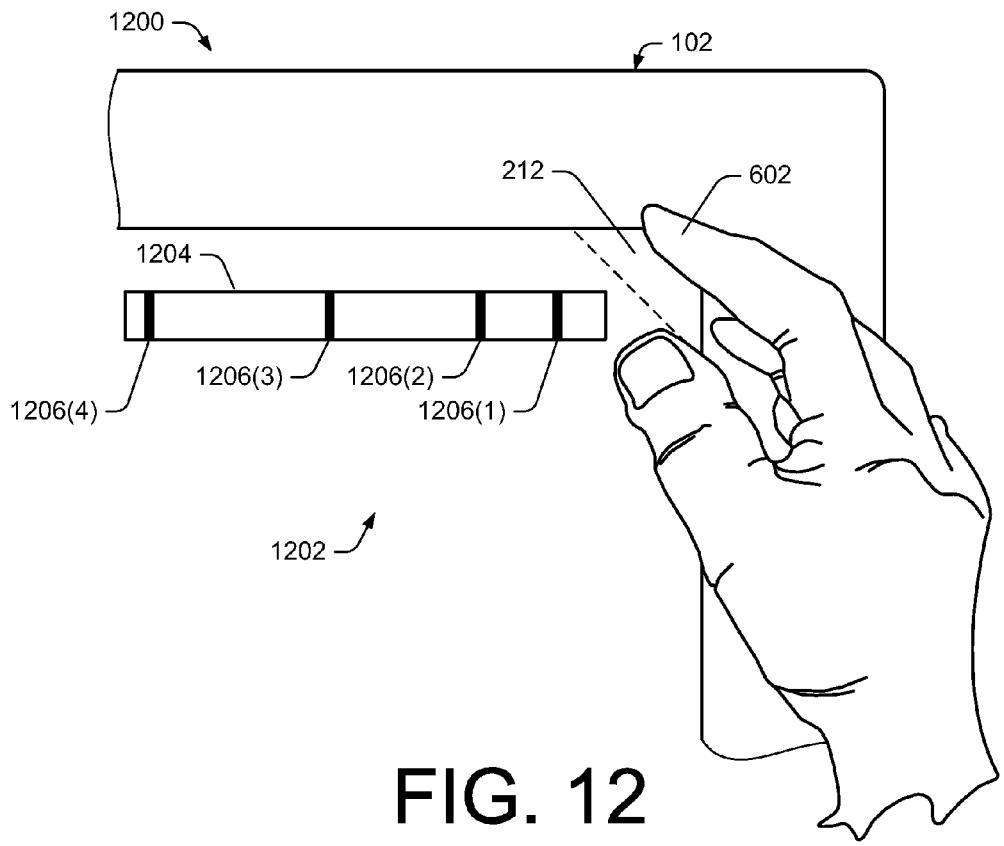
FIG. 12

BOOKMARK NAVIGATION USER INTERFACE

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistant (PDA), portable media players, tablet computers, netbooks, and the like. One particular device that is gaining in popularity is the dedicated electronic book ("eBook") reader device, which attempts to mimic the experience of reading a conventional book through display of electronic information on one or more electronic displays. As the quantity of available media content continues to grow, along with increasing proliferation of such dedicated devices to consume that media content, finding ways to enhance user experience continues to be a priority. As eBook readers continue to evolve, there remains a need for improving a reader's ability to hold and interact with the readers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 10 shows an enlarged, partial plan view of an upper right corner of the eBook reader device to illustrate graphical bookmark indicia with corresponding chapter designations.

FIG. 11 shows an enlarged, partial plan view of an upper right corner of the eBook reader device to illustrate graphical bookmark indicia with corresponding location designations.

FIG. 12 shows an enlarged, partial plan view of an upper right corner of the eBook reader device to illustrate a visual bookmark indicator actuated upon user touch to reveal bookmarks and relative locations of those bookmarks in the content item.

DETAILED DESCRIPTION

This disclosure is directed to user interface techniques for a dedicated handheld electronic book ("eBook") reader device that are designed to facilitate navigation through bookmarked locations as well as chapters in digital content items. To improve user interaction, the display mounted in the eBook reader device is a touch-screen display capable of functioning as both an input and an output component.

For discussion purposes, the bookmark and chapter navigation techniques are described within the context of electronic books being rendered on eBook reader devices. The terms "book", "electronic document", and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book, electronic document, and/or eBook may include any content that is in electronic or digital format.

With such eBooks, the content may be structured as virtual frames presented on the device and a user may turn or change from one virtual frame or "page" of electronic content to another. Furthermore, within the context of this discussion, the term "bookmark" refers to a specified location within the eBook, such as a location or page. Through use of the touch-screen display, users are permitted to intuitively navigate through eBooks rendered on the eBook reader device by utilizing bookmarks, chapters, and touch interaction.

Aspects of the bookmark and chapter navigation techniques may be adopted for use in other content items, such as audio items, video items, and multimedia items. The term "chapter" in these scenarios may be more broadly considered as logical separations or transitions within these forms of items, such as tracks, verses, lyrics, scenes, and so forth. Further, the term "bookmark" in these scenarios may be more broadly viewed as marked locations within these forms of items, such as distinct points within tracks, verses, lyrics, frames, scenes, and so forth. It is further noted that various aspects and features described herein may be implemented in other electronic devices or electronic readers besides dedicated eBook reader devices including, for example, portable computers, personal digital assistants (PDAs), portable gaming devices, wireless phones, and the like.

Illustrative eBook Reader Device

Figure 1:
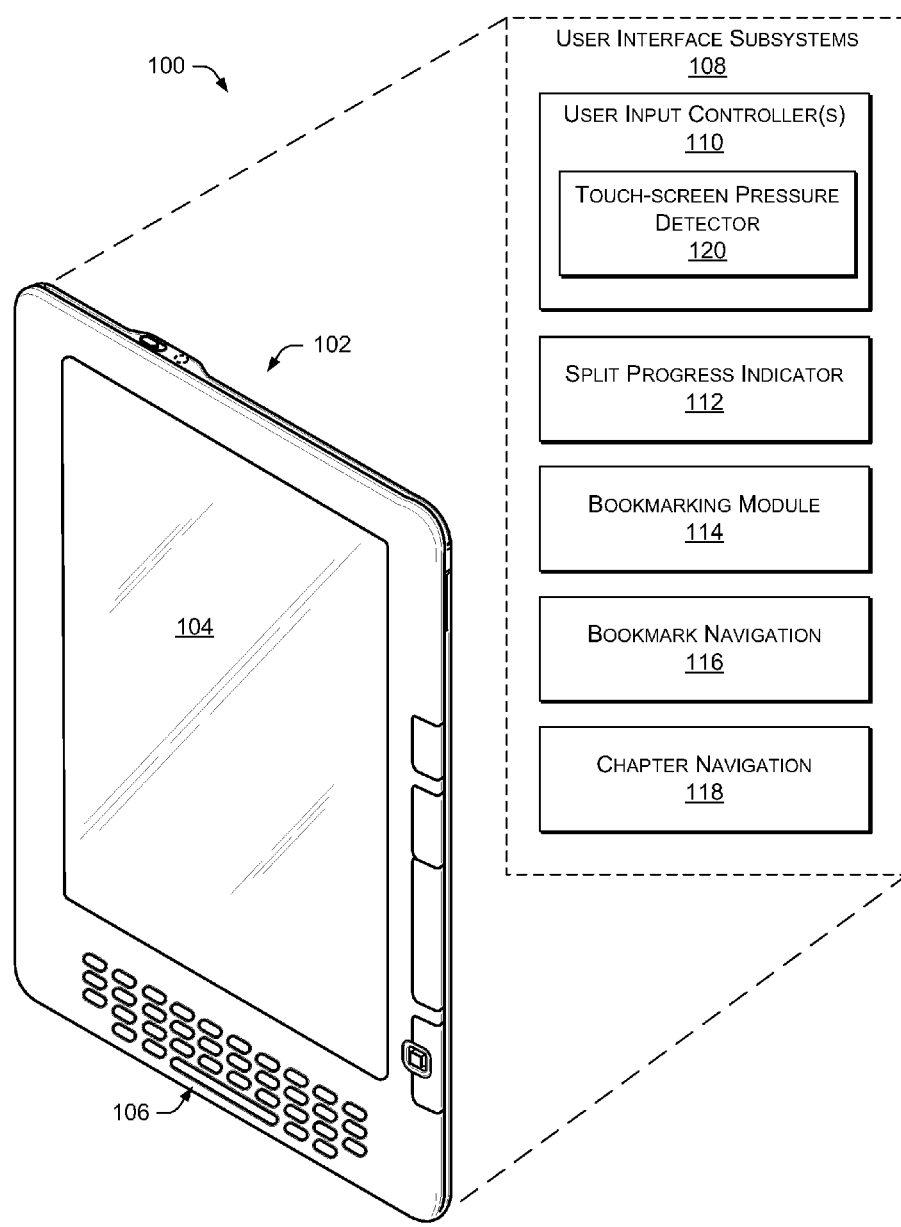
FIG. 1 illustrates one exemplary implementation of a handheld electronic book ("eBook") reader device and a block diagram showing exemplary components that may be implemented in the eBook reader device.

FIG. 1 illustrates an exemplary device architecture 100 which, in one possible implementation, is a handheld dedicated eBook reader device 102. The eBook reader device 102 has a touch-screen display 104, which is implemented with touch-sensitive technology that is responsive to user input registered via, for example, a finger, a stylus, or other similar pointing device. The eBook reader device 102 may also include a keyboard 106 or other types of actuatable elements that may have dedicated or assigned operations. For instance, the device 102 may have a power on/off button, selection keys, joystick, touchpad, and so forth.

The touch-screen display 104 presents content in a human-readable format to a user. The touch-screen display 104 may depict, for example, text of the eBooks, along with illustrations, tables, or graphic elements that might be contained in the eBooks. In some cases, the eBooks may include multimedia components, such as video or audio. In such scenarios, the display 104 (or an additional display) may also be configured to present video, and the device 102 may be equipped with audio output components to play audio files.

For convenience only, the touch-screen display 104 is shown in a generally rectangular configuration. However, the touch-screen display 104 may be implemented in any shape, and may have any ratio of height to width. Also, for stylistic or design purposes, the touch-screen display 104 may be curved or otherwise non-linearly shaped.

In some implementations, the touch-screen display 104 may be implemented using electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. The touch sensitive technology may be overlaid or integrated with the electronic paper display technology to enable user input via contact or proximity to the screen.

In the same or different implementations, the touch-screen display 104 may be a flexible display. The flexible display may be positioned above a touch sensor(s). The touch sensor(s) may be a resistive touch sensitive film. The flexible display may also include a protective layer made of a flexible material such as plastic. The flexible display may also include a flexible backplane layer. The backplane may also be made of a flexible material, such as plastic, metal, glass or a polymer based material. A flexible backplane may be bendable, rollable, light-weight, etc. In one configuration, the flexible backplane is a matrix backplane on a plastic substrate.

The eBook reader device 102 has various internal components, which include user interface subsystems 108. Examples of such components may include one or more user input controller(s) 110, a split progress indicator 112, a bookmarking module 114, a bookmark navigation module 116, and a chapter navigation module 118. These components may be implemented in software, firmware, hardware, or a combination. For software of firmware, the components are provided as computer-readable instructions stored in a computer readable medium, such as volatile or non-volatile memory. The device 102 is equipped with memory to store these components and one or more processors on which the components are executed.

The one or more user input controllers 110 capture user input via the touch-screen display 104, the keyboard 106, and any other user input element on the eBook reader device 102. In some implementations, the input controller(s) 110 may include a touch-screen pressure detector 120, which detects not only the presence of pressure against the touch-screen display 104, but also an amount of pressure applied to the touch-screen display 104. By detecting pressure as a continually-variable input rather than simply as an on/off binary input, the touch-screen pressure detector 120 can differentiate between a soft touch and a hard touch in addition to detecting direction and speed of contact with the touch-screen 104.

The touch-screen pressure detector 120 can provide three-dimensional input by detecting where on the screen pressure is applied (i.e., x-dimension and y-dimension) and the amount of pressure applied to that point (i.e., z-dimension). Thus, the same pressure applied to different points on the surface of the touch-screen (e.g., lower-left hand corner or upper-right hand corner) generates different input signals as well as different pressure applied to the same point on the surface of the touch-screen (e.g., hard versus soft pressure on a point on the screen).

User input may be further differentiated by duration. In some implementations, the amount of time that the touch-screen display 104 detects pressure generates a different input signal. Duration or time of contact may be thought of as providing an alternative third dimension (i.e., time of contact is the z-dimension instead of pressure) or time may supply a fourth dimension in addition to pressure (i.e., x-dimension, y-dimension, pressure, and time). For example, pressing a location on the display 104 for a short period of time may signal a page-turn command while pressing the same location for a long period of time may signal a bookmark command. Furthermore, various pressure and durations (e.g., a short, hard pressure; a short, soft pressure; a long, hard pressure; and a long, soft pressure) may all correspond to a different commands or inputs.

In addition to pressure at a single point, a force applied to an area may be discernable by the touch-screen pressure detector 120. In some implementations, the force is calculated by summing the pressure detected at several points. For example, a user's thumb may contact several pressure sensors simultaneously due to the size and shape of a thumb. In this example, the pressure detected by all the sensors contacted by the thumb may be summed to determine an amount of force.

The split progress indicator 112 provides a visual representation on the display 104 of a reader's progress through an eBook or other content item. The split progress indicator 112 includes at least two separate portions that are located and rendered at different parts of the display. These portions may be arranged along the sides, top, and/or bottom of the screen area. One indicator portion represents "preceding" content that comes before the current location in the eBook, while the second indicator portion represents "subsequent" content that comes after the current location. As the reader reads through the eBook, the first indicator portion might also represent the "read" content that the reader has finished and the second indicator portion might represent "unread" content that the reader has yet to read. The portions vary in appearance (e.g., length, color, size, etc.) as the reader progresses through the eBook. Various example implementations of the visual representation are provided below with respect to FIGS. 2-5.

The bookmarking module 114 bookmarks a page so that the user may rapidly return to the page after viewing other pages. The bookmarking module 114 enables the user to select one or more pages to bookmark, and then associates a bookmark with these pages. The term "page" as used herein refers to a collection of content that is presented at one time in the touch-screen display 104. Thus, a "page" as described herein may be understood as a virtual frame of the content, or a visual display window presenting the content to the user. "Pages" as described herein are not fixed permanently, in contrast to the pages of published "hard" books. Instead, pages described herein may be redefined or repaginated when, for example, the user chooses a different font for displaying the content in the touch-screen display 104. Further, as noted above for scenarios involving other types of content items that may not have pages (e.g., movies, music, etc.), bookmarks may be applied to other frames, verses, scenes, and so forth.

The bookmark navigation module 116 facilitates navigation among the bookmarks within the eBook or other content item. The bookmark navigation module 116 allows the user to place the eBook reader device into a mode in which visual bookmark indicia are presented on the display 104 to assist in navigation throughout the eBook. The reader can touch one or more of these indicia and the eBook reader device jumps temporarily to the corresponding bookmarked location. The reader then has the choice to stay at this bookmarked location, choose another bookmarked location, or return to the original location. In this way, the navigation module 116 provides a user experience akin to the physical book experience where a reader holds a current place in the book, while flipping to another bookmarked location in the book for temporary reference. Various examples of bookmark navigation are described below with reference to FIGS. 6-16.

The chapter navigation module 118 facilitates navigation among chapters in the eBook or other logical sections in different content items. The chapter navigation module 118 provides various UI tactics to facilitate movement from a current location to one or more other chapters in the eBook. For instance, the reader may select (via a tap or touch on the touch-screen display) a predefined visual element on the screen to invoke a chapter navigation menu. As another approach, the chapter navigation module 118 permits the reader to interact with the visual representation of the split progress indicator 112 to jump to various chapters or relative positions within the chapters. In yet another approach, the module 118 supports a pattern or sequence of gestures on the touch-screen display to facilitate transition from chapter to chapter. In each case, the reader has the option to stay at the new chapter location, choose another chapter, or return to the original location. In this way, the chapter navigation module 118 may be configured to provide a user experience akin to the physical book experience where a reader holds a current place in the book, while flipping to other chapters in the book for temporary reference. Various examples of chapter navigation are described below with reference to FIGS. 17-21.

Split Progress Indicator UI

Figure 2:
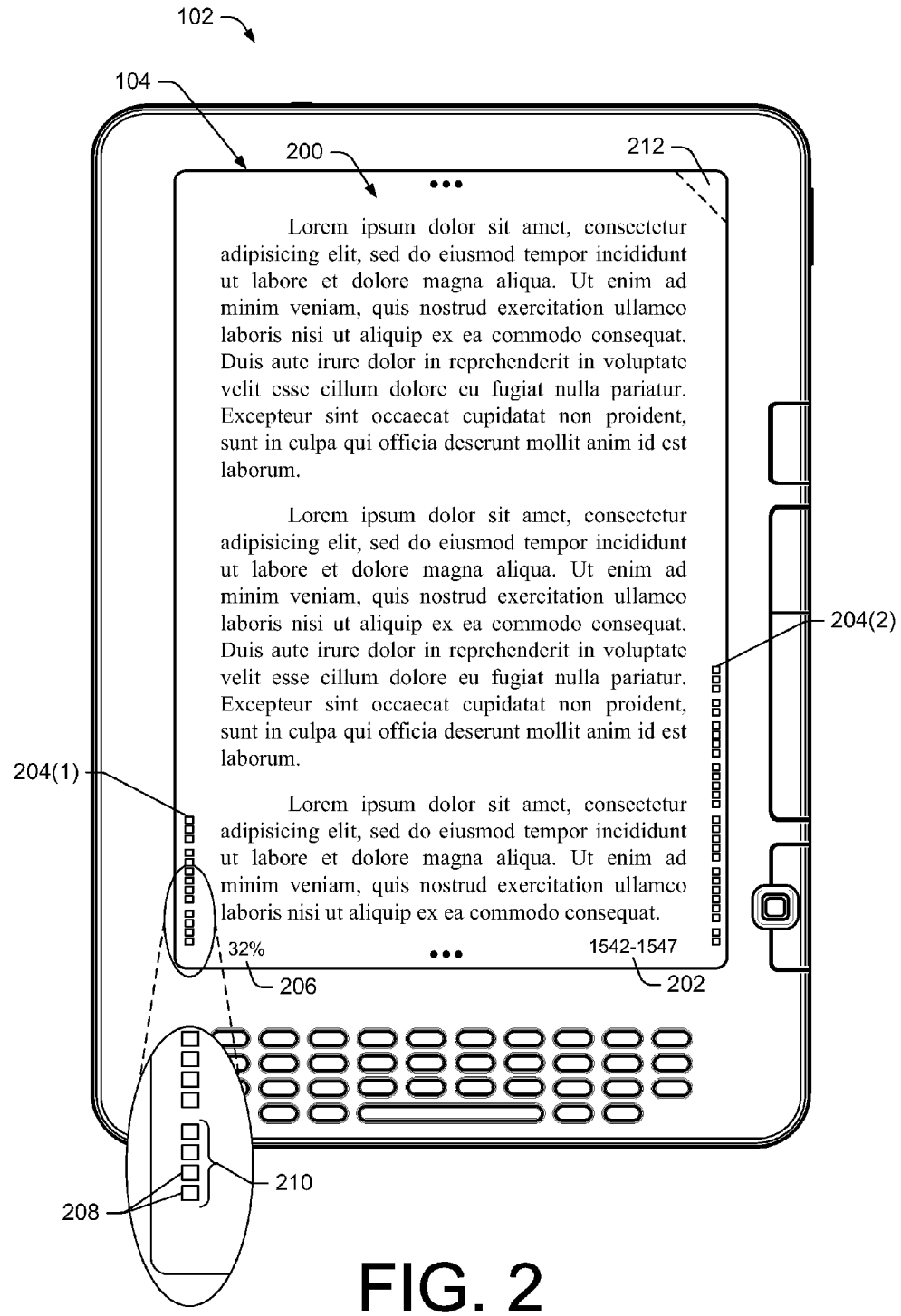
FIG. 2 is a front plan view of the eBook reader device, which depicts a split progress indicator to exhibit a user's progress through a content item.

FIG. 2 shows a user interface representation 200 presented on the touch-screen display 104 of the handheld eBook reader device 102. The UI 200 shows a page of text from an eBook, which is represented by strings of Latin words. The pages may be turned via contact with the touch-screen display 104 or through use of the keyboard or other actuatable elements. In addition to touch location, pressure on the touch-screen display 104 by an object such as the reader's finger or a stylus may cause the eBook reader device 102 to display a different page analogous to turning a page of a physical book.

Recall from above that a "page" may be understood as a virtual frame of the content, or a visual display window presenting the content to the user. The pages presented and turned on the eBook reader device 102 may not correspond directly to the identical hard pages in the associated physical book. Depending on display capabilities, font size, and other such parameters, any given "page" displayed on the eBook reader device 102 may contain more or less text/graphics than the corresponding hard page. Thus, the pages are turned in the sense of changing from one display frame to another. A visual representation of a "page," such as a page number or location identifier 202, may assist the user in distinguishing one page from another. Audio and/or haptic feedback may also be used to provide an indication of pages turning. For example, a sound of actual paper pages of a book being turned could be played each time the "page" of an eBook is turned.

The UI 200 further includes a split progress indicator 204 to represent the reader's progress through the content. The split progress indicator 204 may be used in place of, or in addition to, the location identifier 202. The split progress indicator 204 is composed of a first indicator portion 204(1) and a second indicator portion 204(2) arranged at separate and spaced locations on the screen. In FIG. 2, the first indicator portion 204(1) is arranged vertically along the left side of the display 104, and the second indicator portion 204(2) is arranged vertically along the right side of the display 104. The first indicator portion 204(1) represents the amount or proportion of content that precedes the current location indicated by the location identifier 202, whereas the second indicator portion 204(2) represents the amount or proportion of content that comes after the current location. In this representation, the vertical height of the indicators 204(1) and 204(2) changes in proportion to the amount of content being represented as coming before or after the current location. Thus, as the reader progresses forward in the eBook, the first indicator portion 204(1) grows taller, while the second indicator portion 204(2) gets shorter. As the reader turns pages backward in the eBook from back to front, the first indicator portion 204(1) shrinks, while the second indicator portion 204(2) grows taller.

A percentage completion indicator 206 may also be provided in addition to the progress indicator 204 and the location identifier 202. In this example, the percentage completion indicator 206 is at "32%", and the first indicator portion 204(1) has a height to represent that about one-third of the content precedes the current location and the second indicator portion 204(2) has a height to represent that about two-thirds of the content follows the current location.

The indicator portions 204(1) and 204(2) may be represented in any number of ways, including as elongated bars. In the illustrated implementation, each of the indicator portions 204(1) and 204(2) is formed as groups of individual segments. Each segment 208 represents a predetermined amount of content in the particular eBook. For instance, each segment 208 may represent a certain number of pages of locations, or it may represent a certain percentage of the content (e.g., 1% of the content). The segments 208 are arranged in groups 210 to represent logical sections of the content, such as chapters in an eBook. Thus, as shown in the enlarged view, a lower group 210 has four segments 208, and may be used to represent chapter 1 in an eBook. More generally, the first indicator portion 204(1) has three groups 210—a lower group of four segments to represent chapter 1, a middle group of six segments to represent chapter 2, and an upper group of three segments to represent all or part of chapter 3. In this example, chapter 2 (six segments) is 50% longer than chapter 1 (four segments). In this manner, the reader can glean information at a glance about her overall progress in the eBook, the location within the table of contents (i.e., what chapter she is in), and the relative size of the chapters.

In this example, the groupings of segments are organized around the internal structure of the eBook. In other implementations, the segments may be organized in other ways, such as according to a user centric perspective. For instance, the segments may represent various user interactions with the eBook (e.g., annotations, highlights, etc.) that occur before and after the current page being displayed.

As the reader progresses through the eBook, additional segments are added to the left-side indicator portion 204(1) and removed from the right-side indicator portion 204(2). Conversely, as the reader moves from back toward front of the eBook, additional segments are removed from the left-side indicator portion 204(1) and added to the right-side indicator portion 204(2).

The segments are represented graphically as tiny blocks or squares. Other shapes or indicia may be used. Additionally, rather than using individual segments, small bars may be used to represent each section (e.g., chapter) and the relative length of each bar represents the relative size of the corresponding section.

It should be noted that this visual layout is just one example implementation. The two progress indicator portions may be arranged in other places in the UI 200, such as aligned vertically down from the top of the device (rather than from bottom up). Alternatively, the indicator portions 204 may be arranged horizontally across the bottom and top, where the "read" portion grows across the top and the "unread" portion shrinks along the bottom as the reader progresses through the eBook. Two alternative examples are shown in FIGS. 3 and 4.

A bookmark activation region 212 is provided in the upper right hand corner of the UI 200. The reader may bookmark the current page by touching the region 212, or alternatively place the eBook reader device 102 into bookmark mode by pressing and holding this region 212. Placing bookmarks, and operating in bookmark mode, are described in more detail below with reference to FIGS. 6-16.

Figure 3:
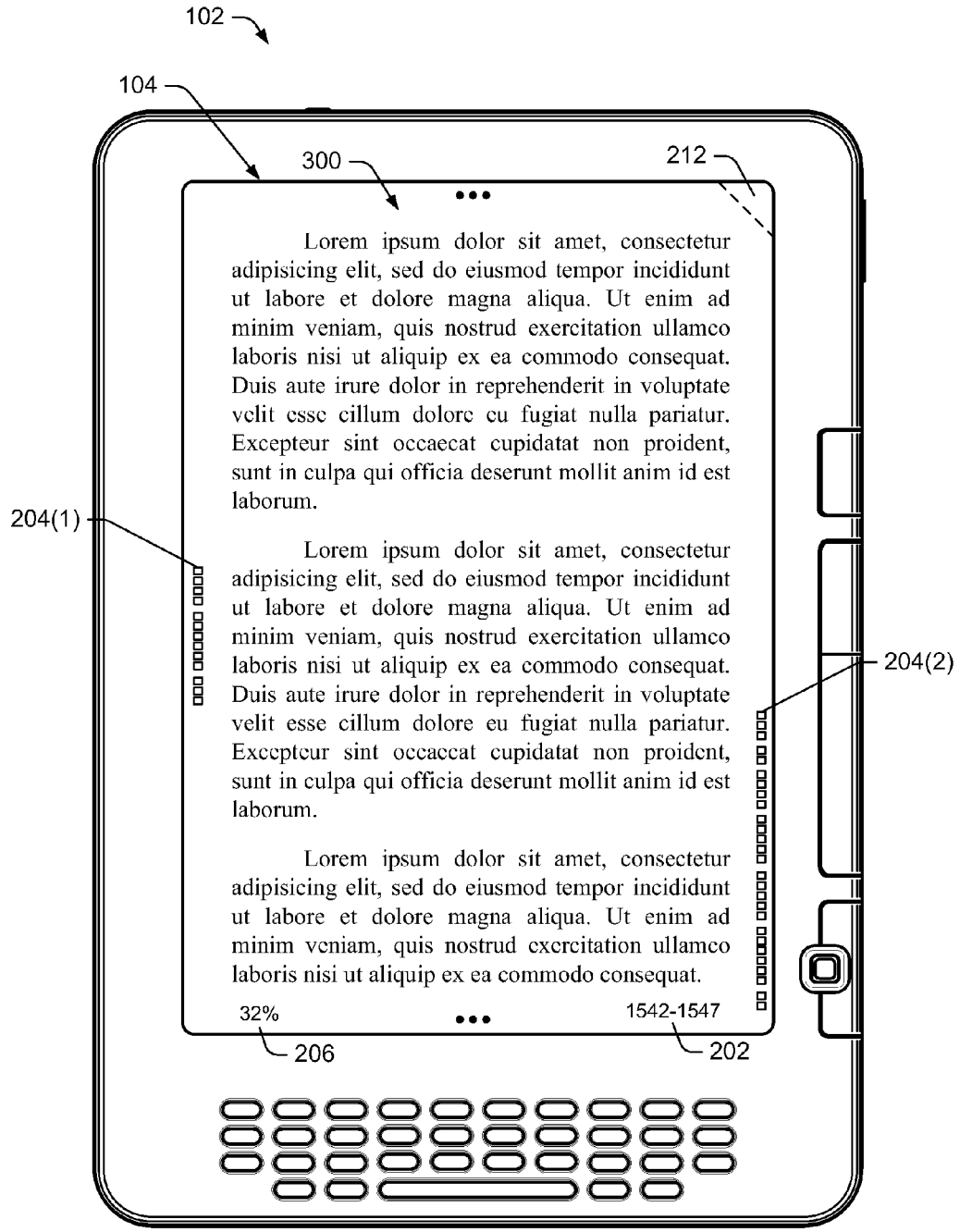
FIG. 3 is a front plan view of the eBook reader device similar to FIG. 2, but depicting another implementation of the split progress indicator.

FIG. 3 shows a user interface representation 300 presented on the touch-screen display 104 of the handheld eBook reader device 102, which exhibits an alternative implementation of the split progress indicator 204. In this example, the left-side indicator portion 204(1) is arranged along the left hand side of the screen area, but extends above the top segment of the right-side indicator portion 204(2), rather than upward from the lower left hand corner as in FIG. 2. In this manner, as the reader progresses through the eBook, the left-side indicator portion 204(1) grows downward from approximately mid-page in this example toward the lower left hand corner. Meanwhile, the right-hand indicator portion 204(2) shrinks downward toward the lower right hand corner. Said another way, as the reader progresses forward in the eBook, segments are visually removed from the top of the right-side indicator portion 204(2) and added to the bottom of the left-side indicator portion 204(1).

Figure 4:
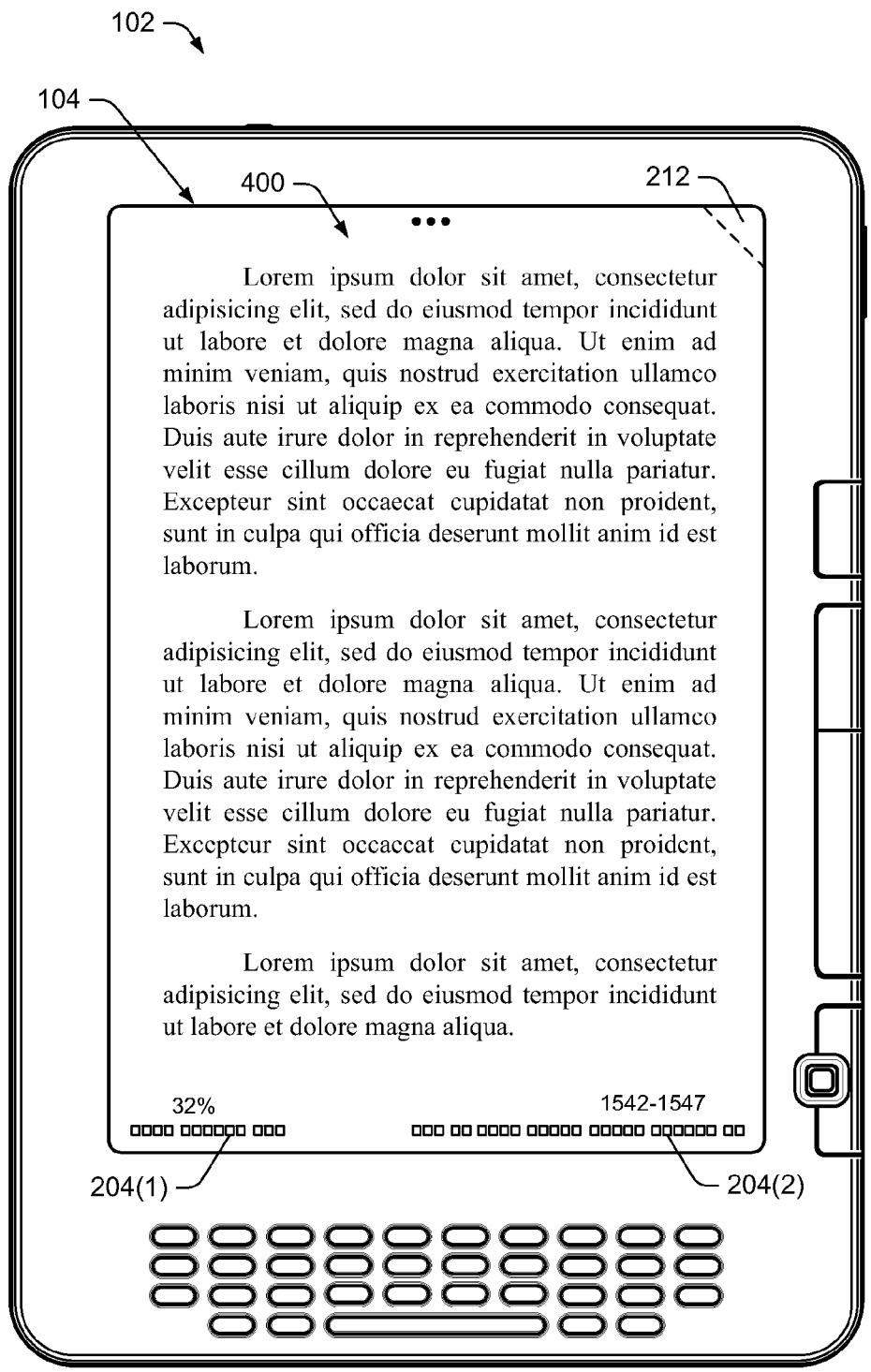
FIG. 4 is a front plan view of the eBook reader device similar to FIG. 2, but depicting yet another implementation of the split progress indicator.

FIG. 4 shows a user interface representation 400 that has yet another implementation of the split progress indicator 204. In this example, the two portions 204(1) and 204(2) are aligned along the same line, but still spaced and separated from one another. Here, the left-side indicator portion 204(1) is left justified and extends horizontally to the right along an imaginary line at the bottom of the display 104. The right-side indicator portion 204(2) is right justified and extends horizontally to the left along the same imaginary line at the bottom of the display 104 such that the two portions 204(1) and 204(2) are collinear, yet separate from one another.

Figure 5:
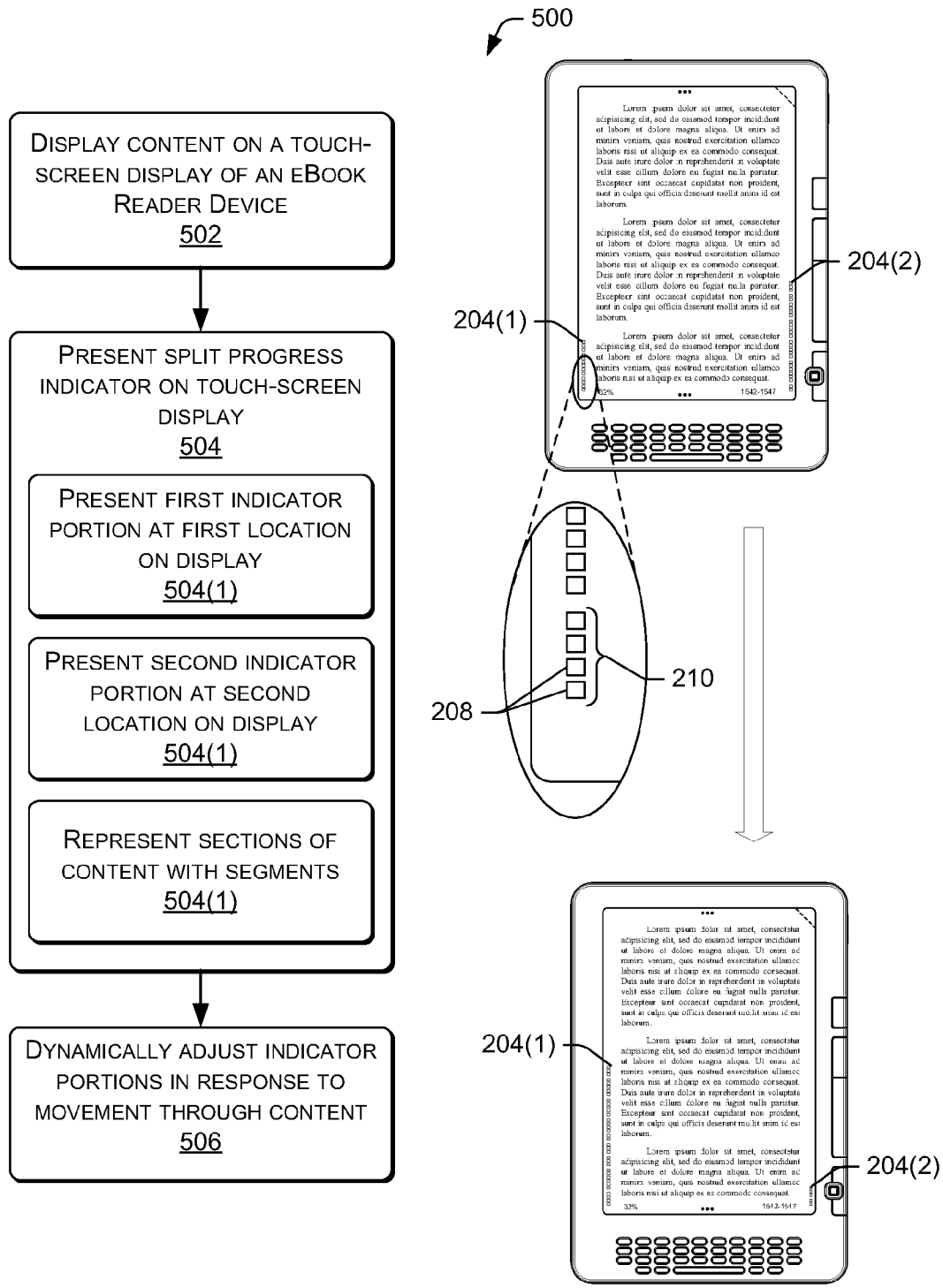
FIG. 5 is a flow diagram illustrating an exemplary process of utilizing the split progress indicator to demonstrate user progress.

FIG. 5 shows a process 500 of utilizing the split progress indicator to demonstrate reader progress. For ease of understanding, the process 500 (as well as processes 1600 in FIGS. 16 and 2100 in FIG. 21) is illustrated as a collection of blocks in a logical flow graph, which represent a sequence of operations or acts that can be implemented in hardware, software, or a combination thereof. In the context of software, the blocks represent computer-executable instructions that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to the device 102 of FIG. 1 and the UI 200 of FIG. 2.

At 502, content is displayed on a touch-screen display 104 of the eBook reader device 102. The content may be from an eBook, such text, graphics, tables, and the like.

At 504, the split progress indicator is also presented on the display 104 in conjunction with the content. At 504(1), a first or "read" indicator portion is presented at a first location on the display 104. At 504(2), a second or "unread" indicator portion is presented at a second location on the display 104, which is spaced and separated from the first location. In the illustrated example involving UI 200, the "read" indicator portion 204(1) is presented vertically along the left side of the display 104 and the "unread" indicator portion 204(2) is presented vertically along the right side of the display 104. The indicator portions are shown on the eBook reader device 102(T1) at a time T1, where the reader is roughly one-third of the way through the eBook. This is evidenced by the "read" indicator portion 204(1) being roughly half the height of the "unread" indicator portion 204(2). At 504(3), sections of the eBook are represented as individual segments 208, which are arranged into groups to represent chapters or other logical delineations.

At 506, the "read" and "unread" indicator portions are dynamically adjusted in response to movement within the eBook. Thus, as the reader progresses forward through the eBook from front to back, the "read" indicator portion 204(1) grows taller, while the "unread" indicator portion 204(2)

shrinks. The indicator portions are shown on the eBook reader device 102(T2) at a time T2, when the reader is much farther though the eBook and nearing the last chapter. This is evidenced by the "read" indicator portion 204(1) being substantially taller than the "unread" indicator portion 204(2), which is nearing the last grouping of segments 208.

Bookmark Navigation

The user interface subsystems 108 further allows the user to place bookmarks and navigate through the bookmarks. FIGS. 6-15 show several different UI screen renderings to facilitate placement of bookmarks and bookmark navigation.

Figure 6:
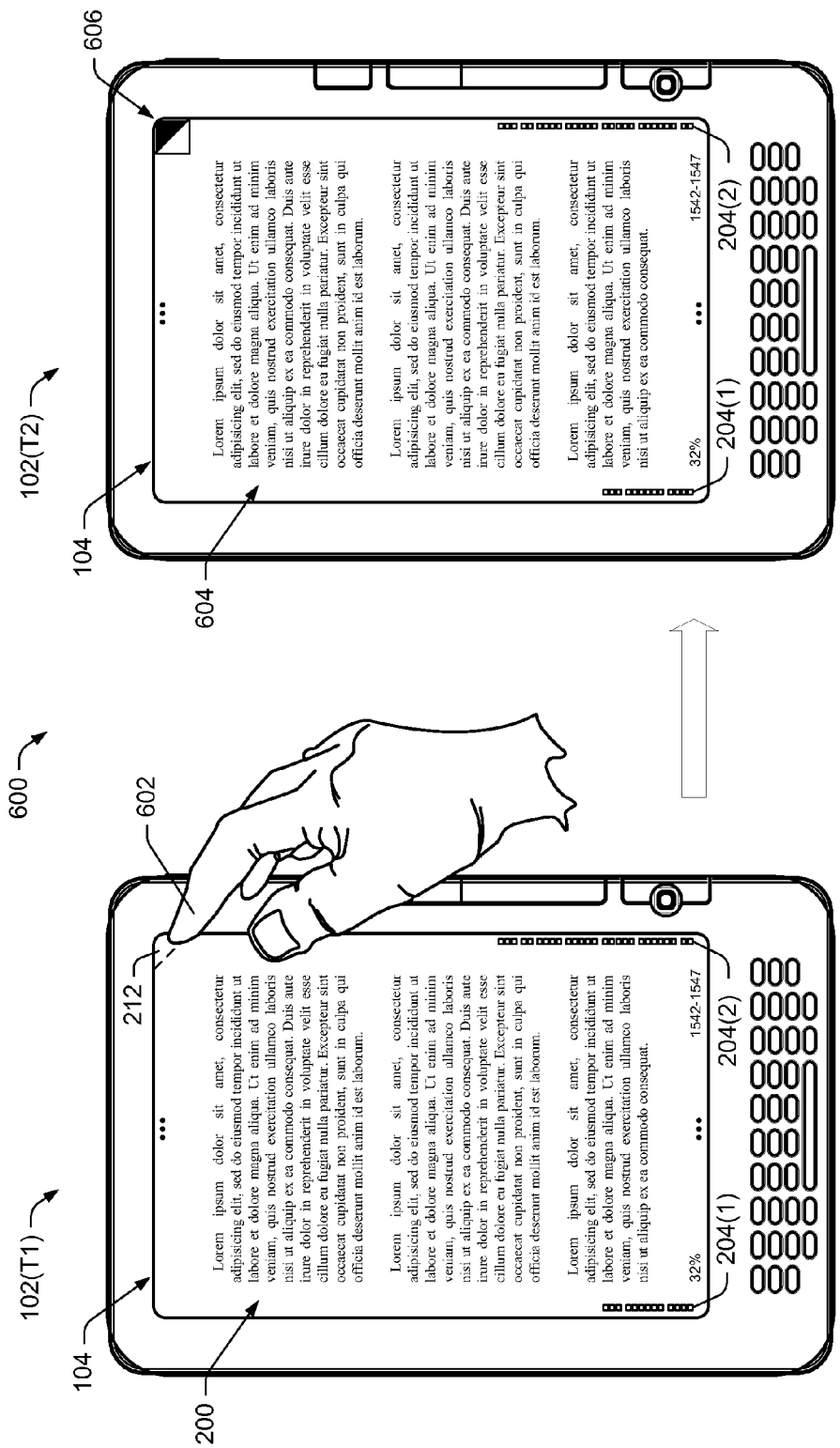
FIG. 6 is a front plan view of the eBook reader device taken at two different times to illustrate an operation of placing a bookmark at the depicted content.

FIG. 6 illustrates a first scenario 600 that shows the eBook reader device 102 taken at two different times T1 and T2 to illustrate an operation of placing a bookmark on the current page. The left-hand instance of the eBook reader device 102 (T1) in FIG. 6, taken at time T1, shows the UI 200 of FIG. 2 that is provided when the reader is operating the device in normal mode. The UI 200 has content from the eBook and the split progress indicator 204(1)-(2) arranged vertically along the left-side and right-side of the display 104. Finally, the UI 200 includes the bookmark activation region 212, which resides in this implementation at the upper right hand corner of the display 104 (although it could be placed elsewhere on the UI 200).

The user may place a bookmark on this page by actuating the bookmark activation region 212 according to a predetermined action. For instance, the reader may briefly touch the region 212 using a finger 602. Other types of contact may be a swiping action, a press and hold, a stronger pressure, a double touch, and so forth, although these actions may be reserved for other operations.

The right-hand instance of the eBook reader device 102 (T2) in FIG. 6, taken at a time T2, shows a UI 604 that is presented after the reader places a bookmark by touching the region 212. Notice that the region 212 is replaced with a new bookmark graphic 606 having a darkened triangular region juxtaposed with a triangular shaped graphic. The bookmark graphic 606 has an appearance intended to visually convey the equivalent of a corner piece of a paper page being folded over onto the page to mark that page of the book.

The reader may also place the eBook reader device 102 into bookmark navigation mode through another touching action. For instance, the reader may press and hold the bookmark activation region 212 to transition the device to bookmark navigation mode. Alternatively, various forms of pressure or multi-touch input may be used to place the device into the bookmark navigation mode. In yet another implementation, a touch of the region 212 in conjunction with a directional swiping gesture may be used to transition to the bookmark navigation mode. This latter implementation is demonstrated in the following FIGS. 7-9.

Figure 7:
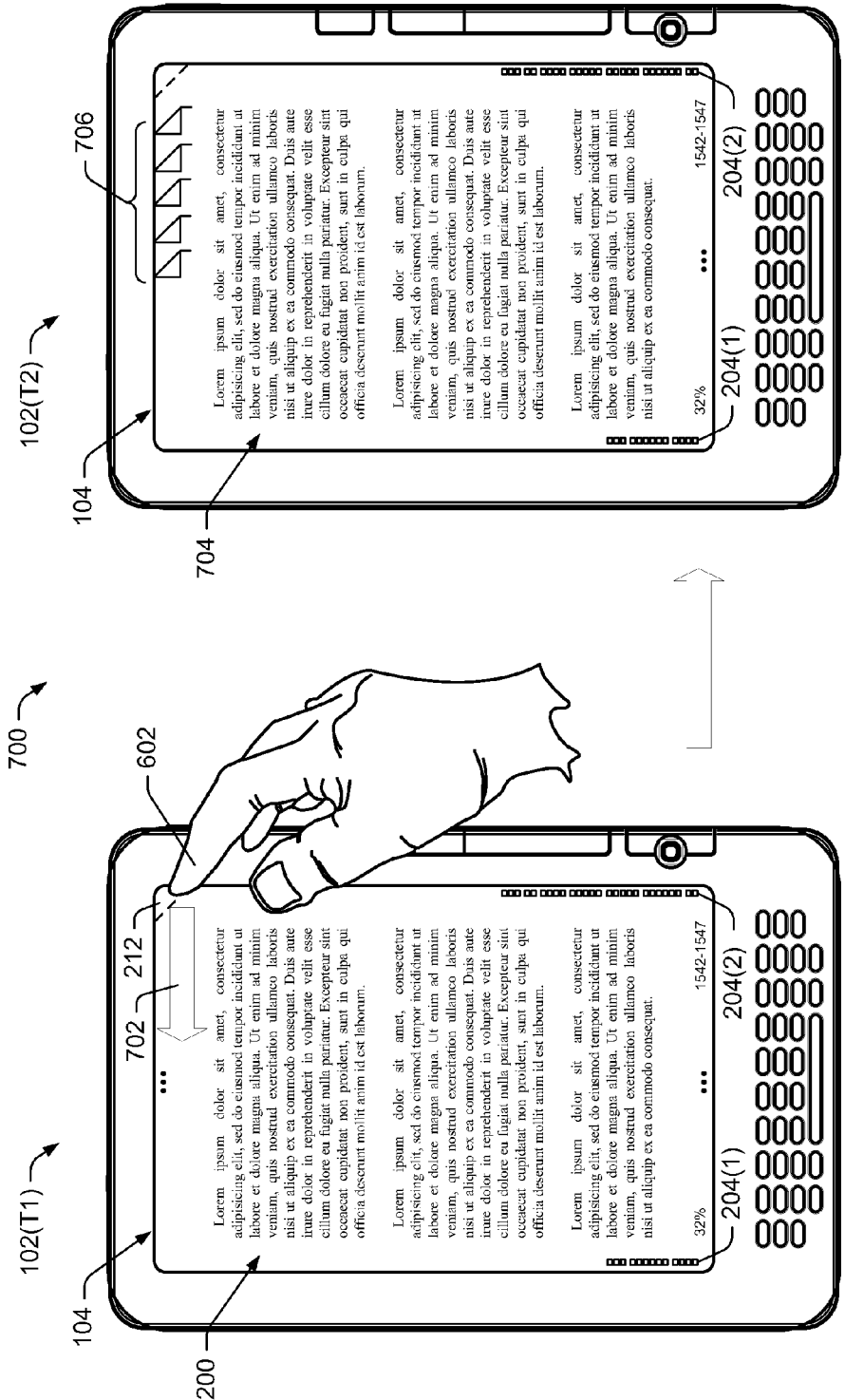
FIG. 7 is a front plan view of the eBook reader device taken at two different times to illustrate an operation of placing the device in bookmark navigation mode and revealing preceding bookmarks that were placed at locations in the content item before the current location being depicted.

FIG. 7 illustrates a scenario 700 in which the eBook reader device 102, shown at two different instances in time T1 and T2, performs a UI operation to transition into bookmark navigation mode. The left-hand instance of the eBook reader device 102(T1), taken at time T1, shows the UI 200 of FIG. 2 that is provided when the reader is operating the device in normal mode. In this example, the reader touches the region 212 and slides her finger 602 to the left as illustrated by arrow 702. The touch and directional slide places the eBook reader device 102 into the bookmark navigation mode and reveals the preceding bookmarks that were placed before the current location in the eBook.

The right-hand instance of the eBook reader device 102 (T2), taken at a time T2, shows a new UI representation 704 that is presented after the reader makes the touch and leftward swipe motion with her finger 602. In response, one or more bookmark indicia 706 are illustrated across the top margin of the display. In this example, the bookmark indicia 706 are represented by triangular icons to represent preceding pages that have been bookmarked. All or some of the preceding bookmarks are revealed, depending upon the number of bookmarks, size of the indicia 706, and the amount of viewable space available. In this illustration, five preceding bookmarks 706 are shown to represent five bookmarked locations prior to the currently displayed page.

Figure 8:
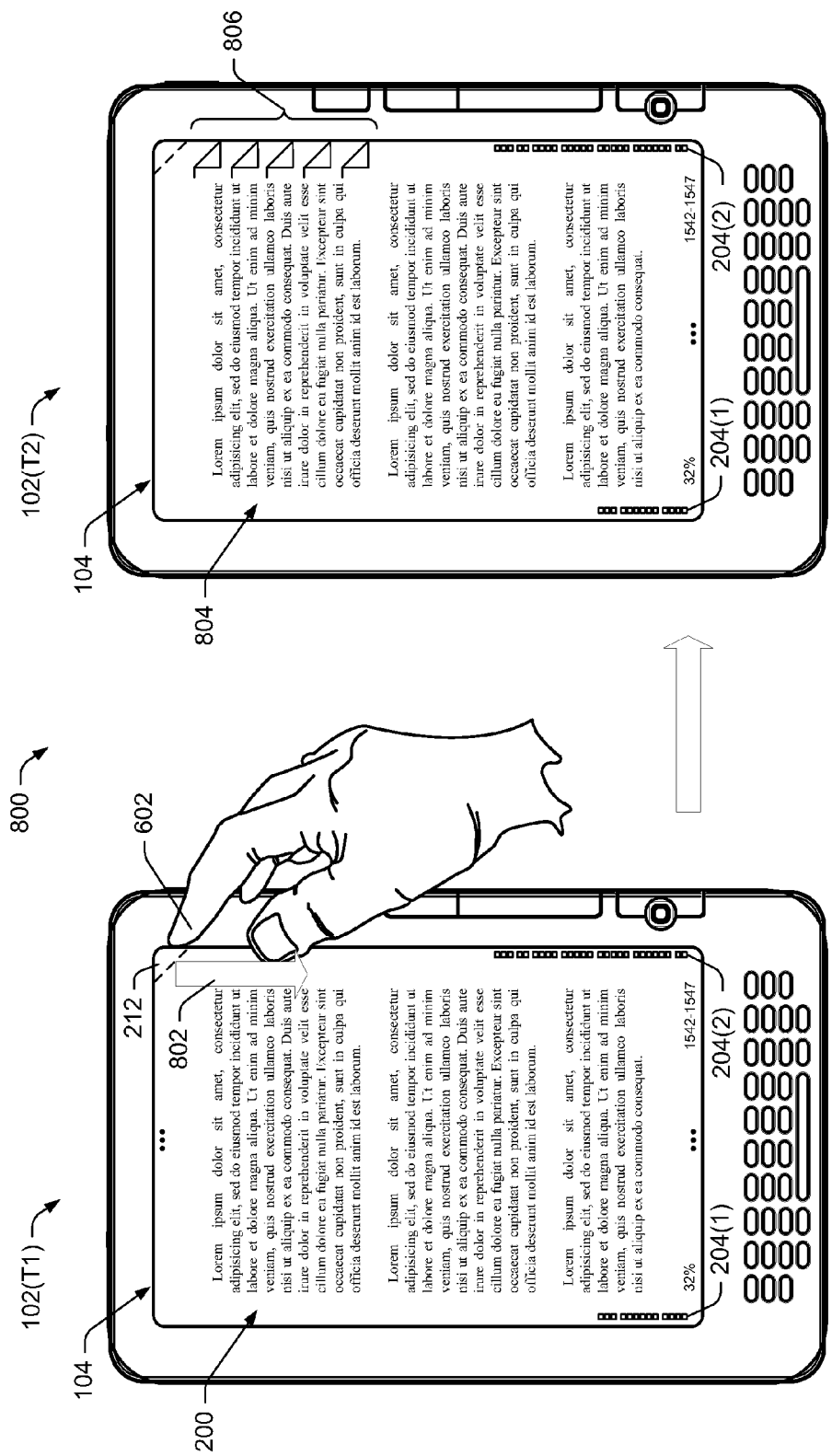
FIG. 8 is a front plan view of the eBook reader device taken at two different times to illustrate an operation of placing the device in bookmark navigation mode and revealing subsequent bookmarks that are placed at locations in the content item subsequent to the current location being depicted.

FIG. 8 illustrates another scenario 800 of a UI operation for placing the device in bookmark navigation mode. Again, the eBook reader device 102 is shown at two different instances of time T1 and T2. In this scenario 800, the reader touches the region 212 and slides her finger 602 vertically downward as illustrated by arrow 802 in the left-hand instance of the eBook reader device 102(T1). The touch and directional slide places the eBook reader device 102 into the bookmark navigation mode and reveals the subsequent bookmarks that exist at locations after the current location in the eBook.

The right-hand instance of the eBook reader device 102 (T2), taken at a time T2, shows a new UI representation 804 that is presented on display 104 after the reader makes the touch and downward swipe motion with her finger 602. In response, one or more bookmark indicia 806 are illustrated vertically along the right margin of the display. In this example, the bookmark indicia 806 are represented by triangular icons to represent that certain subsequent pages are bookmarked. All or some of the subsequent bookmarks may be shown, depending upon the number of bookmarks, the size of the indicia 806, and the amount of viewable space available. In this illustration, there are five subsequent bookmarks 606 depicted to represent five bookmarked locations that occur in the eBook after the currently displayed page.

Figure 9:
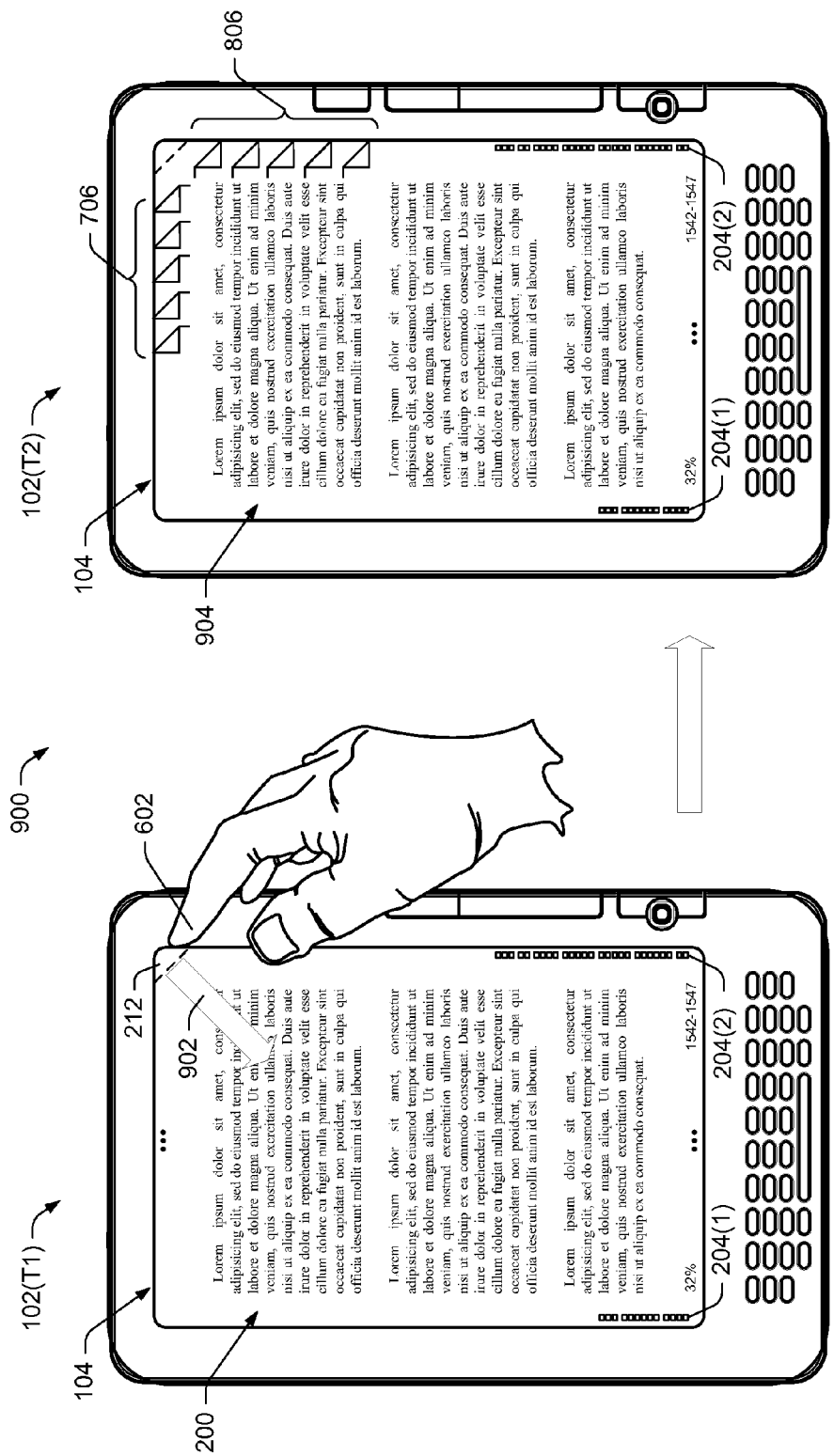
FIG. 9 is a front plan view of the eBook reader device taken at two different times to illustrate an operation of placing the device in bookmark navigation mode and revealing both preceding and subsequent bookmarks.

FIG. 9 illustrates a third scenario 900 to demonstrate yet another UI operation of placing the eBook reader device 102 in bookmark navigation mode. In this scenario, the reader touches the region 212 and slides her finger 602 diagonally away from the corner of the device as illustrated by arrow 902 in the left-hand instance of the eBook reader device 102(T1). The touch and diagonal slide places the eBook reader device 102 into the bookmark navigation mode, while revealing both the preceding and subsequent bookmarks. The right-hand instance of the eBook reader device 102(T2), taken at a time T2, shows a new UI representation 904 with the preceding bookmark indicia 706 aligned along the top margin and the subsequent bookmark indicia 806 aligned along the right margin of the display 104.

In each of the scenarios of FIGS. 7-9, the current page is not bookmarked as represented by the corner tab in region 212 not being folded over, either before or after the eBook reader device is placed into bookmark navigation mode. However, in other implementations, the current page may be bookmarked before and after the device is placed into navigation mode, and this would be represented by the darkened corner with a folded over tab as represented by the bookmark graphic 606 of FIG. 6.

FIG. 10 shows an enlarged view 1000 of the upper right corner of the eBook reader device 102 to illustrate an alternative feature of the graphical bookmark indicia. In this example, each bookmark icon of the indicia 706 and 806 is associated with a chapter number. For instance, a bookmark icon 1002 has an associated chapter number "10" to convey to the reader that this bookmark is found in chapter 10 of the eBook. The addition of chapter numbers intuitively aids the reader in better understanding where bookmarks are located throughout the eBook. For instance, with a glance, the reader can learn from the indicia 706 that there are preceding bookmarks in chapters 1, 2, and 3 and from indicia 806 that there are subsequent bookmarks in chapters 7, 9, and 10.

FIG. 11 shows an enlarged view 1100 of the upper right corner of the eBook reader device 102 to another implementation of the graphical bookmark indicia. In this example, a location identifier (rather than a chapter number) is associated with each bookmark icon of the indicia 706 and 806. For instance, a bookmark icon 1102 has a corresponding identifier "3589" to convey to the reader that this bookmark is found at location 3589 of the eBook. Thus, the reader can quickly glean from the indicia 706 that there are preceding bookmarks at locations 405, 973, and 1384 and from indicia 806 that there are subsequent bookmarks at locations 2841, 3147, and 3589. The location identifier provides a more specific or accurate indication of where the bookmark is placed in the eBook as compared to the chapter number in FIG. 10. It is further noted that the location identifier may be converted to a "page" number as well, which may correspond to the page numbering determined based on the rending of the eBook (i.e., font size, etc.) or to an approximate page number in the corresponding physical book.

FIG. 12 illustrates an enlarged view 1200 of the upper right corner of the eBook reader device 102 to show an implementation of a visual bookmark indicator 1202. In this example, the reader touches the activation region 212 and begins to slide her finger 602 horizontally across the touch-screen display 104. In response, a bar-shaped bookmark indicator 1202 is presented in a region proximate to the reader's sliding motion. The bookmark indicator 1202 includes an elongated, rectangular member 1204 that is scaled proportionally to represent the content that comes before the current location in the eBook. Within the rectangular member 1204 are one or more tally marks 1206 that represent one or more corresponding bookmark locations. In this example, there are four tally marks 1206(1)-(4) in the indicator 1202. The tally marks 1206(1)-(4) are spaced visually within the rectangular member 1204 at distances proportional to the distances from the current location to the bookmarked locations. Thus, the tally mark 1206(1) closest to the region 212 represents the nearest bookmark to the current location if the reader were to turn pages toward the front of the eBook. The tally mark 1206(4) that is farthest from the region 212 represents the farthest bookmark from the current location, but nearest to the front of the eBook.

The bookmark indicator 1202 lends an intuitive understanding of preceding bookmarks and the relative distance of those bookmarks from the current page. The reader may move her finger 602 back and forth along the indicator 1202 to select one of the tally marks 1206(1)-(4) and thereby choose a preceding bookmarked location. The UI selects the tally mark closest to where the reader last touches, lifts her finger, applies added pressure, or performs some other action. In other implementations, chapter numbers or location identifiers may be presented in conjunction with the tally marks 1206(1)-(4), similar to those shown in FIGS. 10 and 11.

Although not shown, a similar bookmark indicator may be invoked by the reader moving her finger 602 vertically downward from the region 212. The vertical bookmark indicator will also have spaced tally marks to represent bookmarks that follow the current page, as well as relative distances between the bookmarks and from the current page.

Once the eBook reader device is placed in bookmark navigation mode represented, for example, by UIs 704, 804, and 904, the reader may select bookmarked locations using the bookmark indicia 706 or 806. The reader may choose one or more indicia and jump to various bookmarked locations in the eBook, without losing her current place in the eBook. For purposes of continuing discussion, suppose the eBook reader device 102 is placed into the bookmark navigation mode shown as UI 704 in FIG. 7, where the eBook reader device 102(T2) is shown at a time T2.

Figure 13:
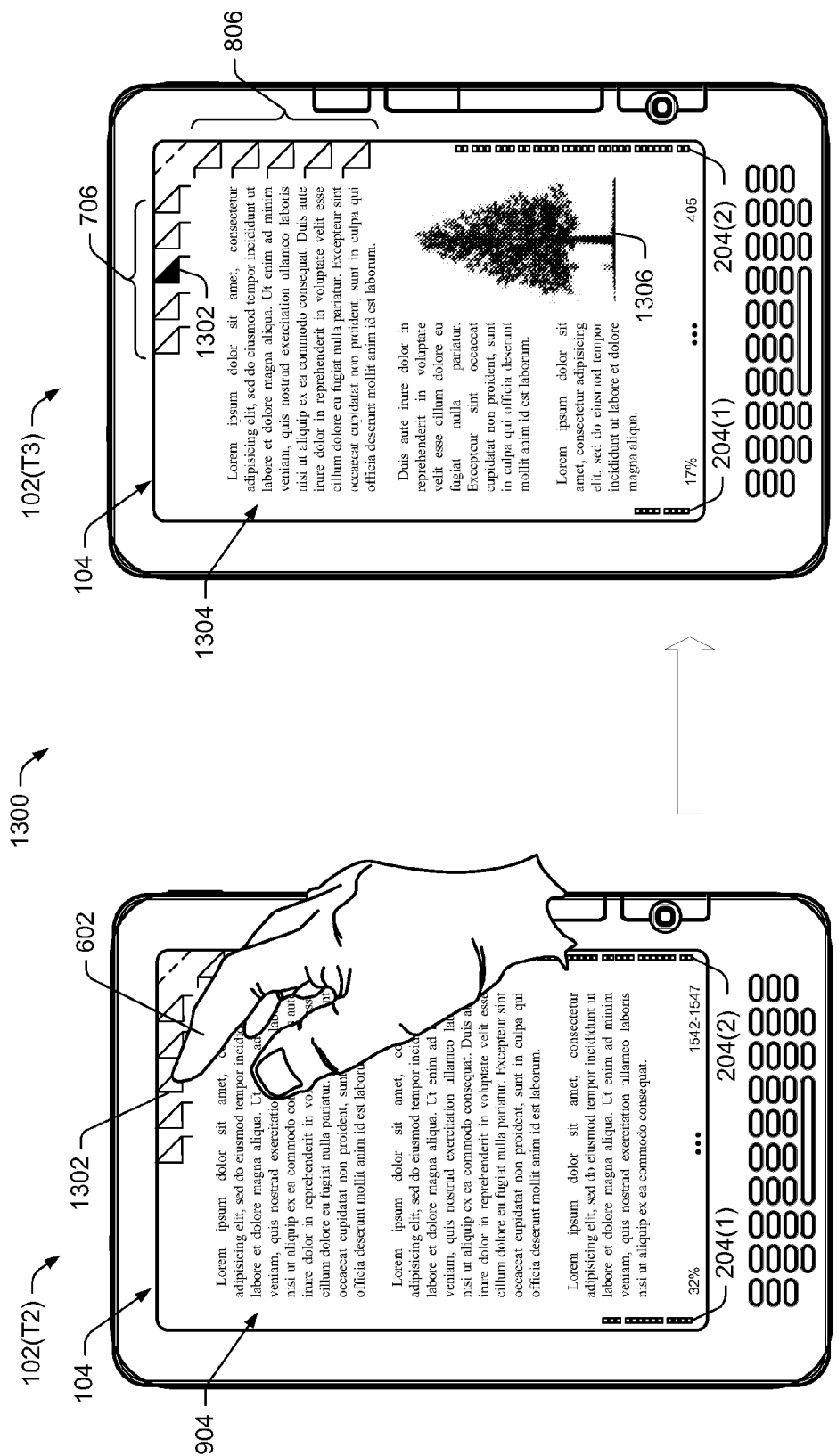
FIG. 13 is a front plan view of the eBook reader device taken at two different times to illustrate an operation of selecting a bookmark and in response, temporarily relocating and presenting the portion of content at the bookmarked location.

FIG. 13 illustrates a scenario 1300 to demonstrate a bookmark navigation operation of selecting a bookmark from the UI 904 and in response, temporarily relocating and presenting the portion of content at the selected bookmarked location. The reader chooses the bookmark by touching or otherwise gesturing relative to a particular bookmark icon 1302 of the upper horizontal indicia 706. In response to that action, the right-hand instance of the eBook reader device 102(T3), taken at a time T3, shows a new UI representation 1304 that includes new content, as represented by different text format and a tree image 1306. Additionally, the selected bookmark icon 1302 is colored, or otherwise visually modified, to represent the selected bookmark and to convey that the current page corresponds to that bookmark.

Notice also that the split progress indicator 204 has been adjusted. Since the reader selected a preceding bookmark toward the front of the eBook, the left-side indicator portion 204(1) shrunk in height to visually convey that the reader moved forward in the eBook, as there is now less content coming before the currently displayed location. Meanwhile, the right-side indicator portion 204(2) grew taller to visually convey that there is now more content coming after the currently displayed location.

The eBook reader device 102(T3) remains in bookmark navigation mode, and hence the bookmark indicia 706 and 806 remain visible. Thus, the relocation may be only temporary, as if the reader simply wished to reference a bookmarked location. In a sense, this action is akin to the physical scenario of holding one's place in the book, while flipping pages to a preceding bookmarked page. While in this mode, the reader may select one or more other bookmarks represented by the indicia 706 and 806 to move to associated bookmarked locations in the eBook. The eBook reader device 102(T3) remains in the bookmark navigation mode until explicitly instructed to leave the mode, or in some implementations, until a timeout period elapses.

Figure 14:
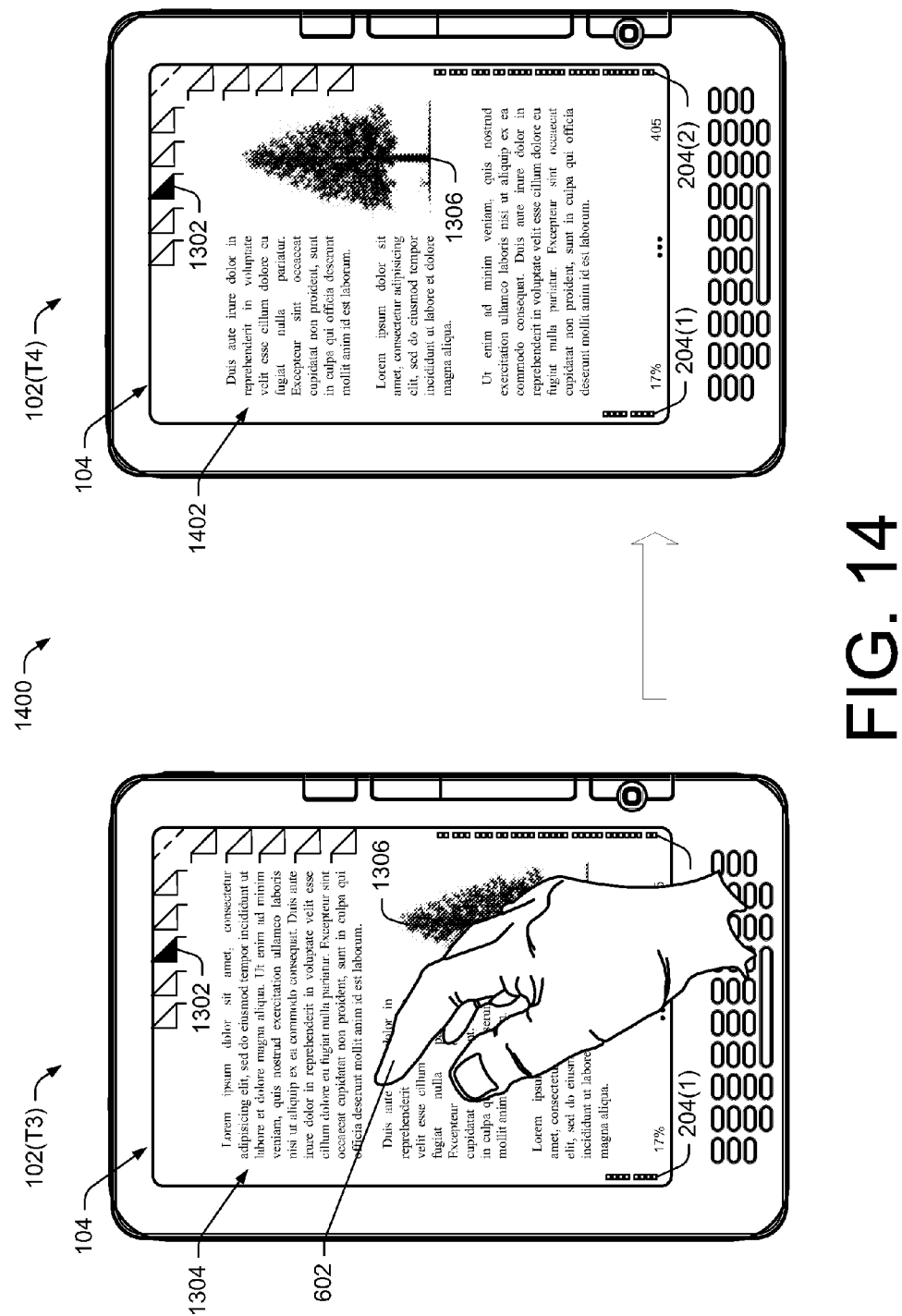
FIG. 14 is a front plan view of the eBook reader device taken at two different times to illustrate an operation of selecting a region within the portion of content at the bookmarked location, and in response, refocusing the portion of content on the display.

FIG. 14 illustrates a scenario 1400 in which the reader selects a region within the portion of content at the bookmarked location and in response, refocuses the portion of content on the display. As shown, the left-hand instance of the eBook reader device 102(T3) shows the UI 1302 that was presented at time T3 in FIG. 13. In scenario 1400, the reader touches or otherwise gestures to a spot within the content area of the UI 1302, as represented by the reader's finger 602 touching a center spot of the content. In response, the eBook reader device refocuses the content so that the touched spot is now at the top of the display 104. The right-hand instance of the eBook reader device 102(T4), taken at a time T4, shows a new UI representation 1402 that has the content shifted upward so that the tree image 1306 and the adjacent narrow paragraph are shifted upward to the top of the display 104.

In some implementations, the reader may move around in the content relative to this bookmarked location while the reader device 102 is in the bookmark navigation mode. Further, the reader may select other bookmarked locations by choosing one or more icons of the bookmark indicia 706 and 806.

When the reader wishes to exit the bookmark navigation mode, the reader may elect to return to the original location, as represented by UI 200 in FIGS. 2 and 6. To return to the original location, the reader merely taps the bookmark activation region 212 twice—once to return to the original content and a second time to leave the bookmark navigation mode. Alternatively, the reader may remain permanently at the bookmarked location by selecting the bookmark icon 1302 a second time.

Figure 15:
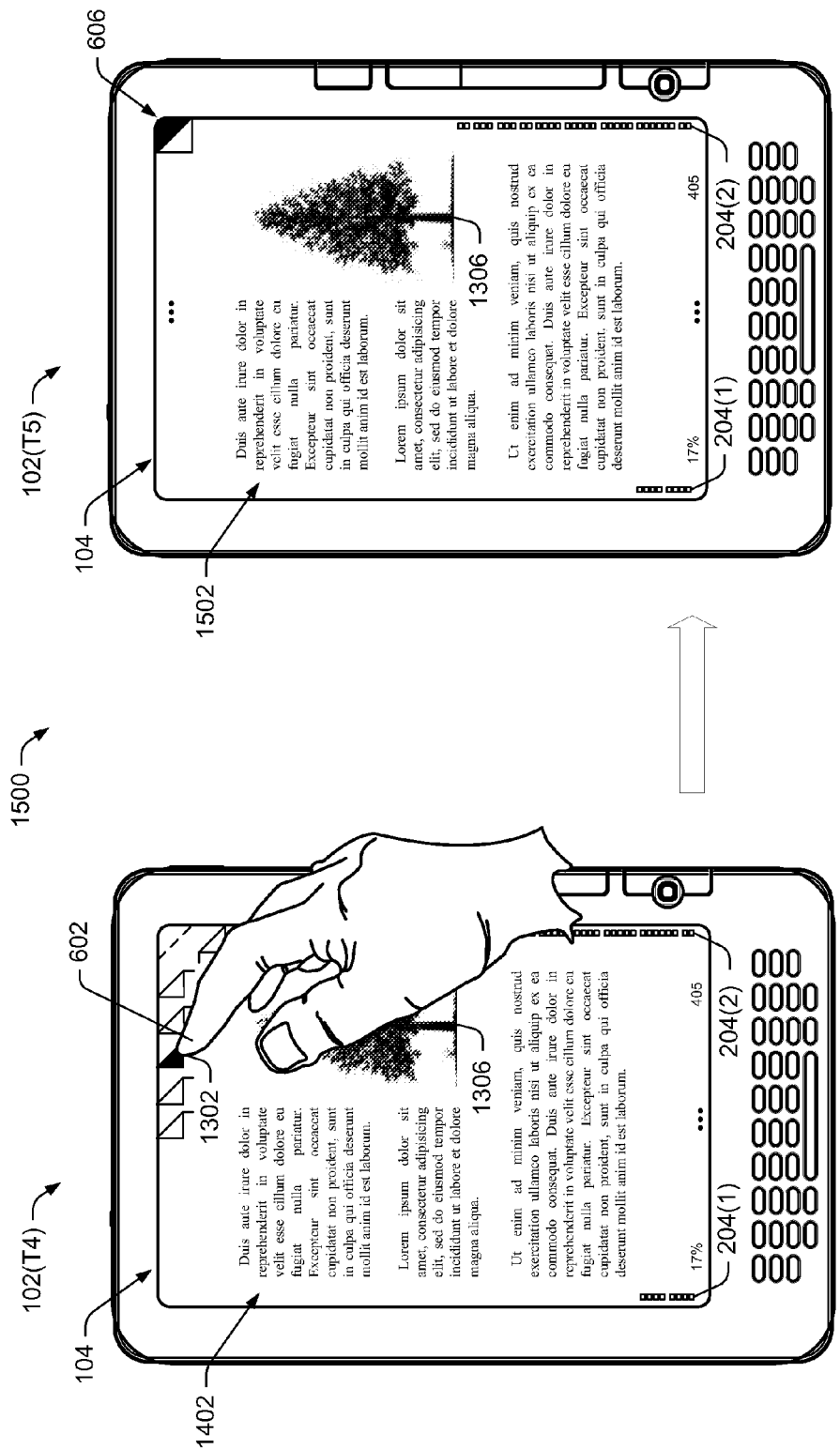
FIG. 15 is a front plan view of the eBook reader device taken at two different times to illustrate an operation of selecting a bookmark a second time, and permanently relocating to the portion of content at the bookmarked location.

FIG. 15 illustrates this latter scenario 1500 in which the reader taps the bookmark icon 1302 a second time to permanently relocate to the bookmarked location. As shown, the left-hand instance of the eBook reader device 102(T4) shows the UI 1402 that was presented at time T4 in FIG. 14 after the content was shifted upward on the display. In scenario 1500, the reader touches or otherwise gestures to the bookmark icon 1302 with her finger 602. In response, the eBook reader device leaves the bookmark navigation mode and remains on the bookmarked page. The right-hand instance of the eBook reader device 102(T5), taken at a time T5, shows a new UI representation 1502 that contains the content at the bookmarked location. Since the device has exited the bookmark navigation mode, the bookmark indicia 706 and 806 are removed from the edges. However, since this particular page has been previously bookmarked, the bookmark graphic 606 is provided in the upper right hand corner of the UI 1302. The reader may now operate from this location in the eBook in a normal mode, or re-enter the bookmark navigation mode.

The discussion above describes various actions in response to touch contact. However, many alternative or additive gesture techniques may be used. For instance, gesture techniques such as press-and-hold, press-and-slide, swipe, application of varying amounts of pressure, tap, sequences of contacts, multi-touch, and the like may be used to operate the device. Further, the number of fingers or simultaneously touch locations used in any given gesture may alter the intended input.

Figure 16:
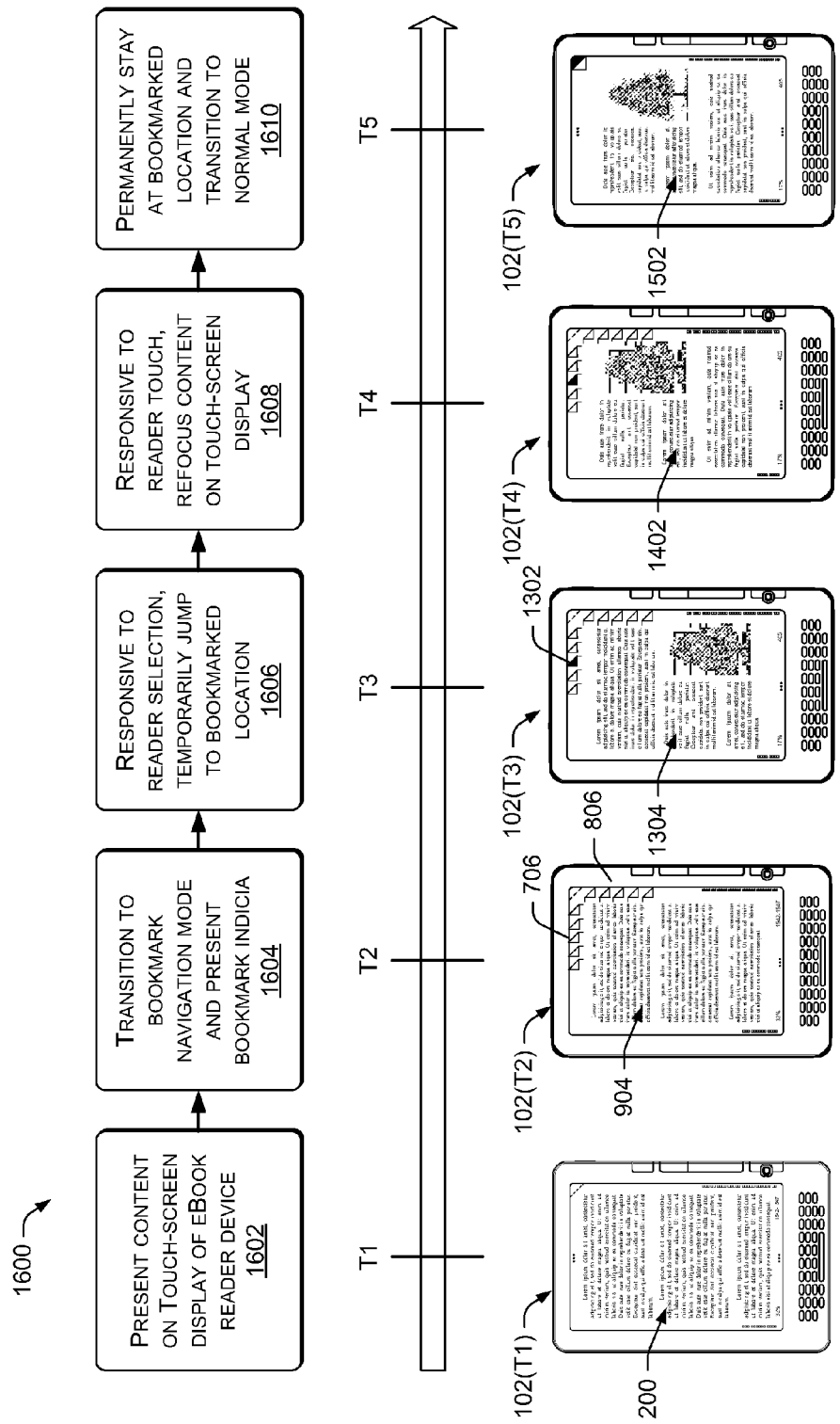
FIG. 16 is a flow diagram illustrating an exemplary process of using bookmark navigation to temporarily and permanently move locations in the content item.

FIG. 16 shows a process 1600 of using bookmark navigation to temporarily and permanently move locations in the content item. For discussion purposes, the process 1600 is described with reference to the scenarios 900, 1300, 1400, and 1500 of FIGS. 9 and 13-15.

At 1602, content is displayed on a touch-screen display 104 of the eBook reader device 102. The content may be from an eBook, such text, graphics, tables, and the like. The content represents a current location within the eBook, as represented by the UI 200 of the eBook reader device 102 taken at time T1.

At 1604, the eBook reader device is transitioned to the bookmark navigation mode. In one implementation, the reader touches the activation region 212 and then slides directionally from that region (to the left, downward, or diagonally). This touch-and-slide action places the eBook reader device into the bookmark navigation mode and reveals one or more existing bookmarks. One example UI 904 shows bookmark indicia 706 and 806 aligned along the top and right edges of the display, as represented by the eBook reader device 102(T2) from FIG. 9.

There are several options for the reader while in the bookmark navigation mode. One option is to jump to one or more bookmarked locations by using the bookmark indicia 706 and 806 as navigation controls. The reader can jump from location to location, while maintaining her place at the current page shown in UI 200. One example of this navigation is described next.

At 1606, responsive to reader selection of a particular bookmark icon, the eBook reader device temporarily jumps to a bookmarked location in the eBook that corresponds with the selected bookmark icon. In one implementation, the reader touches, taps, or otherwise actuates a particular bookmark icon among the indicia 706 and 806. The display is refreshed to temporarily show the content located at the bookmark location. One example is shown by the eBook reader device 102(T3) taken at time T3 in FIG. 13, where a UI 1304 shows content from the bookmarked location that corresponds to the selected bookmark icon 1302. The split progress indicator is adjusted to correspond to the bookmark location.

Another option is for the reader while in bookmark navigation mode is to simply read from the temporary bookmark location. The reader may begin reading and turn pages as if starting from that location. Still another option is that the reader may decide to perform other functions at the bookmarked location, such as refocusing the content. Suppose, for example, the bookmarked location does not show table or graph in its entirety, and hence the reader may adjust the view until all or other portions of the table are shown. One example of this operation is described next.

At 1608, the reader may optionally touch spots within the content. In response to this user input, the eBook reader device refocuses the content. In one implementation, the reader touches or otherwise gestures to a particular spot in the content, as represented by the touch applied mid-page in FIG. 14. In response, a new UI 1402 is presented that shifts the content at the bookmarked location upward approximately one-half of a page to position the tapped spot at the top of the display. This is shown, for example, by the eBook reader device 102(T4) taken at time T4.

The reader may always leave the bookmark navigation mode and return to the normal mode. In one implementation, the reader may simply return to the current page at UI 200 and leave the bookmark navigation mode. In another implementation, the eBook reader device may return to the original page following a timeout period in which the reader did not interact with the eBook reader device. Another option, however, is to remain permanently at the bookmarked location and leave the bookmark navigation mode. This example option is described next.

At 1610, the reader may optionally remain at the bookmarked location permanently, rather than temporarily, but transition back to normal mode. In one implementation, the reader touches the bookmark icon 1302 a second time, as represented by the touch applied in FIG. 15. In response, a new UI 1502 is presented on device 102(T5). The new UI 1502 retains the content at the bookmarked location as in UI 1402, but removes the bookmark indicia to show that the device has transitioned back to normal mode.

Chapter Navigation

With reference again to FIG. 1, the user interface subsystems 108 further allows the user to navigate among the chapters (or other devising sections) of a content item. FIGS. 17-21 show several different UI screen renderings to facilitate chapter navigation.

Figure 17:
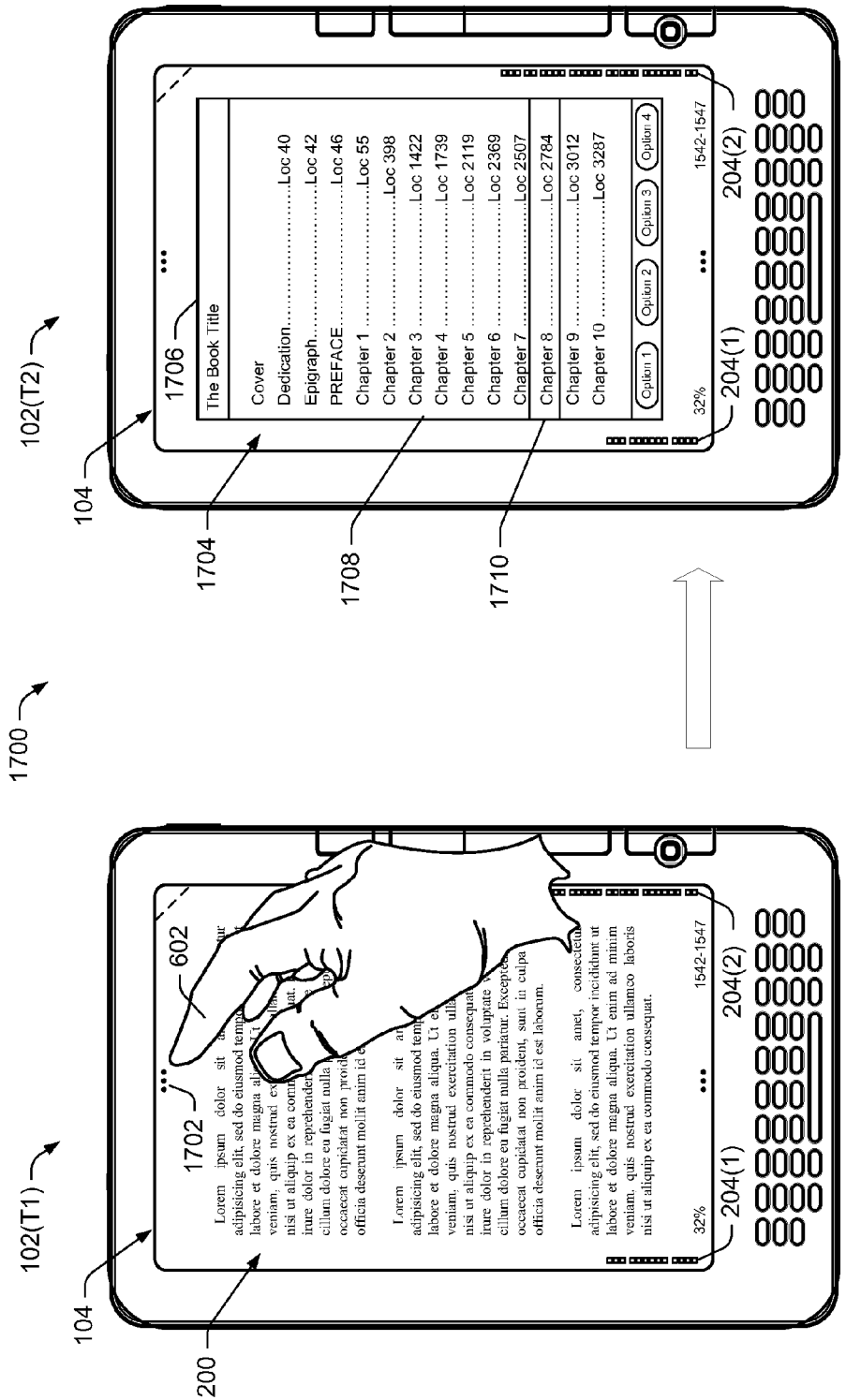
FIG. 17 is a front plan view of the eBook reader device taken at two different times to illustrate a chapter navigation operation of selecting chapter navigation indicia and in response, invoking a chapter navigation menu.

FIG. 17 shows a scenario 1700 in which the eBook reader device 102 is taken at two different times T1 and T2 to illustrate one operation that facilitates chapter navigation. The left-hand instance of the eBook reader device 102(T1) in FIG. 17, taken at time T1, shows the UI 200 of FIG. 2 that is provided when the reader is initially operating the device in normal mode. At the top of the UI 200 is a graphical element 1702 that functions as an input control to invoke a chapter navigation panel. In this example, the graphical element 1702 is a series of three filled circles that are linearly aligned, although other graphical indicia may be employed.

When the user actuates the control 1702 via a touch or gesture with her finger 602, a chapter navigation panel 1704 is presented on the display 104, as shown by the right-hand instance of the eBook reader device 102(T1) taken at time T2. The chapter navigation panel 1704 may fill the entire display 104, or otherwise illustrated as being overlaid atop the underlying page of the eBook. In this example, the chapter navigation panel 1704 includes a book title 1706 and a table of contents 1708 containing a listing of various chapters and the corresponding locations of the eBook given the current device settings (e.g., font size, screen size, etc.).

To facilitate chapter navigation, the user may simply touch or otherwise gesture to one of the chapters listed in the table of contents 1708. For instance, the user may touch "Chapter 4" in the table of contents 1708 and the eBook reader device jumps to the start of Chapter 4 and depicts this new page on the display 104. In other implementations, other forms of navigation control may be employed. For example, one implementation involves having a controllable focus 1710 that can be maneuvered over the panel 1704 using one or more control elements (e.g., keyboard, joystick, touch, gesture, etc.). The user may move the focus 1710 up and down over the table of contents 1708 to identify a desired chapter to which the user wishes to navigate. In this example, the focus 1710 is positioned over chapter 8 and upon user selection, the eBook reader device 102 will move to the start of Chapter 8 from its current location.

Figure 18:
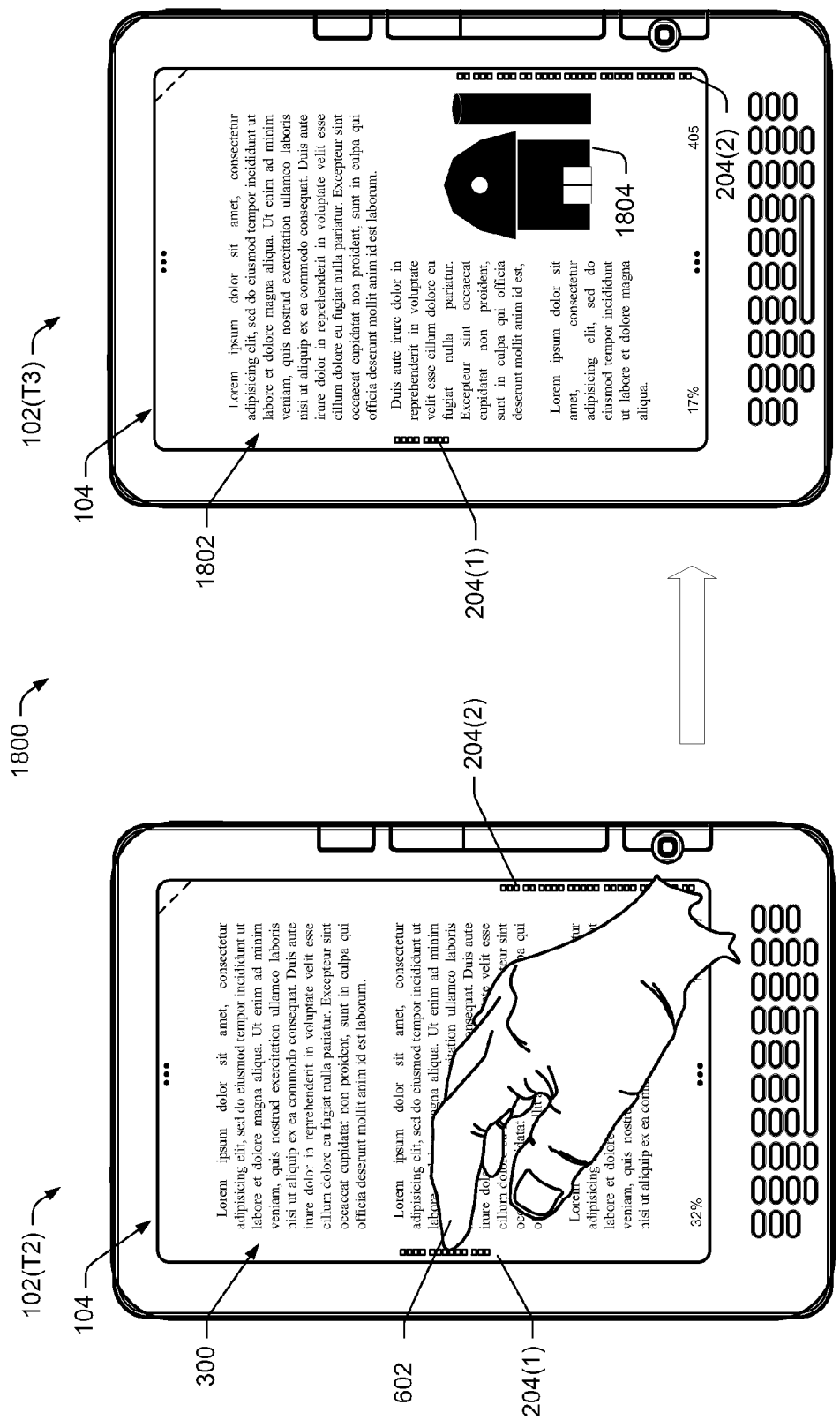
FIG. 18 is a front plan view of the eBook reader device taken at two different times to illustrate a chapter navigation operation of selecting a portion of the split progress indicator and in response, moving to a different chapter represented by the portion of the split progress indicator.

FIG. 18 shows a scenario 1800 to illustrate another operation that facilitates chapter navigation. In scenario 1800, the eBook reader device 102 is shown at two different times T1 and T2 to illustrate a chapter navigation operation of selecting a portion of the split progress indicator and in response, moving to a different chapter represented by the portion of the split progress indicator. The left-hand instance of the eBook reader device 102(T1) in FIG. 18, taken at time T1, shows the UI 300 of FIG. 3 that has the split progress indicator 204 arranged along opposite sides of the display 104. The user may contact any part of the split progress indicator 204 to effectuate navigation among the chapters. In this example, the user's finger 602 touches or otherwise gestures relative to the left-side indicator portion 204(1) in the grouping of segments indicating chapter 2.

In response to this action, the eBook reader device 102 navigates to chapter 2, either at the beginning of the chapter or somewhere within the chapter. In this example, the user touches somewhere near the middle of the segment grouping in indicator portion 204(1) and hence the eBook reader device 102 interprets that action as a desire to transition to somewhere in the middle of chapter 2 proportional to the contact location within the segment grouping. Thus, right-hand instance of the eBook reader device 102(T2) in FIG. 18, taken at time T2, shows a new UI 1802 that depicts a page in the middle of chapter 2 having an image of a barn 1804. Notice that the split progress indicator 204 is updated to reflect the new page, with the left-side indicator portion 204(1) being smaller to indicate the user moved back to chapter 2, and the right-side indicator portion 204(2) growing taller by a corresponding amount.

The user may then continue to move to new chapters by touching other parts of the split progress indicator 204. Alternatively, the user may return to the previous page by using a back button control on the device, or a soft key that may be depicted (not shown), or some other predefined action.

Figure 19:
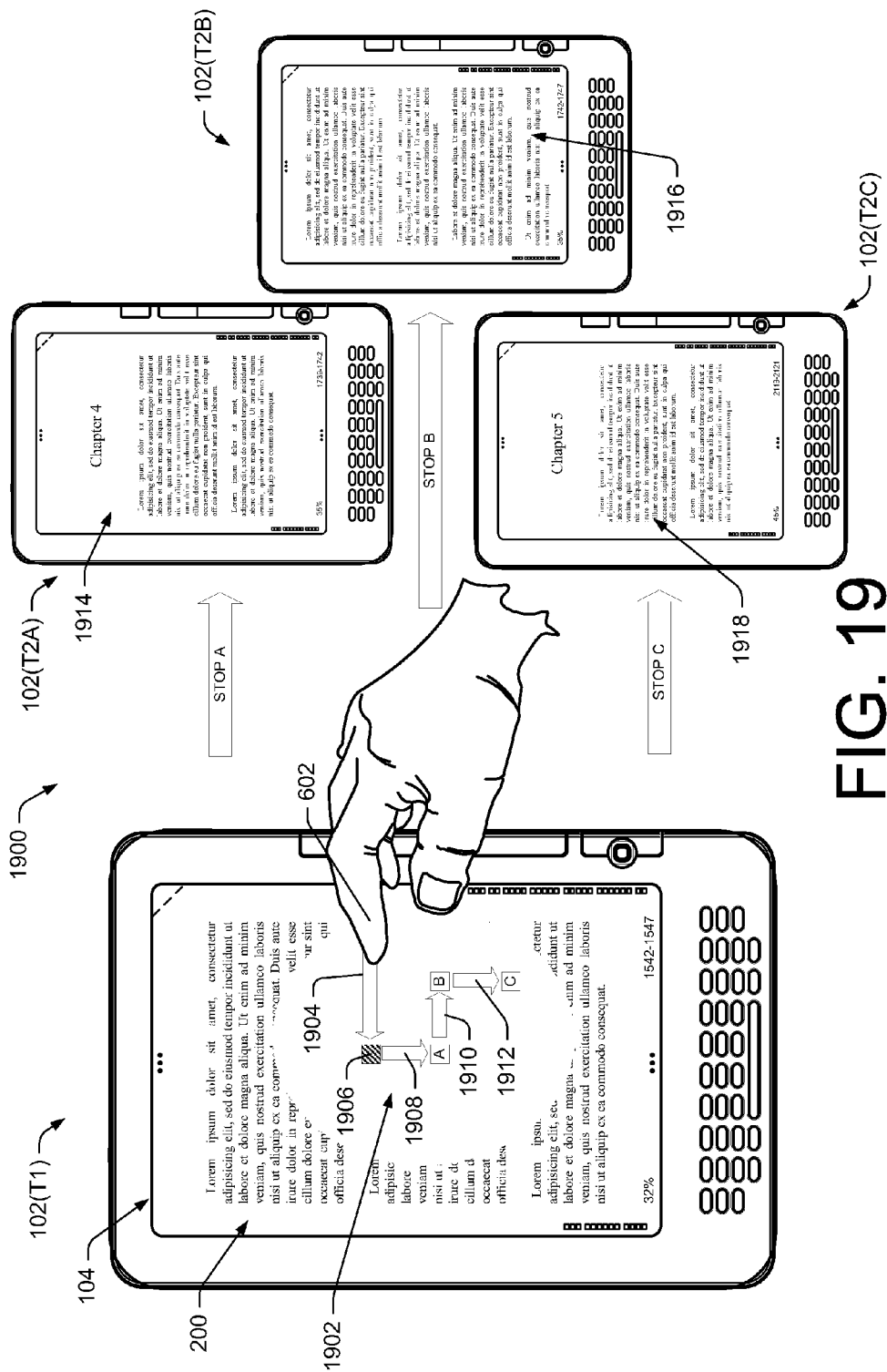
FIG. 19 is a front plan view of the eBook reader device to illustrate chapter navigation using defined contact patterns on a touch-screen display, and various outcomes depending upon the patterns.

FIG. 19 shows a scenario 1900 to illustrate yet another way to accommodate chapter navigation. In scenario 1900, the eBook reader device 102 is shown at two different times T1 and T2 to illustrate chapter navigation using defined contact patterns on a touch-screen display, and various outcomes depending upon the patterns. The left-hand instance of the eBook reader device 102(T1) in FIG. 19, taken at time T1, shows the UI 200 of FIG. 2 that has the split progress indicator 204 arranged along opposite sides of the display 104.

The user initiates a chapter navigation operation by tracing a pattern onto the touch-screen display 104. Each pattern consists of a sequence of non-linear strokes that are made contiguously without the user lifting her finger 602 (or stylus) once the sequence is started. In this example, a chapter navigation pattern 1902 is shown as a sequence of orthogonal strokes made vertically and horizontally on the display 104. More specifically, the pattern 1902 includes a leftward horizontal stroke 1904 to an anchor point 1906 represented by the hashed square. This is followed by a downward vertical stoke 1908 to a juncture "A", which is followed by a rightward horizontal stroke 1910 to another juncture "B", and finally followed by a downward vertical stroke 1912 to yet another juncture "C".

The anchor point 1906 indicates the point that separates a normal gesture, such as turning a page by swiping from right-to-left, to a chapter navigation pattern. By pausing and changing directions at the anchor point 1906, the user is instructing the eBook reader device to switch to a chapter navigation mode. Further, the anchor point serves as a place to which the user may return to remain at the same location in the eBook, essentially canceling the previous strokes. That is, retracing the various strokes 1912, 1910, and 1908 without lifting finger 602 would leave the user at the present location in the eBook.

Each subsequent stroke following the anchor point 1906 provides an additional navigation instruction to the device. In this example, vertical strokes move chapter-to-chapter. A downward vertical stroke (e.g., strokes 1908 and 1912) advances one chapter at a time toward the end of the eBook. An upward vertical stroke (not shown) moves one chapter at a time toward the beginning of the eBook. Additionally, horizontal stokes move a single page forward (for a left-to-right motion) and a single page backward (for a right-to-left motion).

Three example outcomes of corresponding chapter navigation patterns are illustrated in FIG. 19. Three instances of the eBook reader device 102 are shown, each at a subsequent time T2, according to whether the user stopped the chapter navigation pattern 1902 at juncture A, B, or C. Suppose the user stops the pattern 1902 at juncture A, after two directional strokes 1904 and 1908. In this scenario, the user essentially instructs the eBook reader device to move to the next chapter (i.e., chapter 4), as represented by the new UI screen rendering 1914 on an instance of the eBook reader device 102(T2A), taken at a time T2. Next assume the user stops the pattern 1902 at juncture B, after three directional strokes 1904, 1908, and 1910. In this case, the user is instructing the eBook reader device to move to the next chapter (i.e., chapter 4) and the next page after the first page of that chapter. This outcome is represented by the new UI screen rendering 1916 on an instance of the eBook reader device 102(T2B), taken at a time T2. Finally, suppose the user stops the pattern 1902 at juncture C, after four strokes 1904, 1908, 1910, and 1912. Here, the user is instructing the eBook reader device to move two chapters (i.e., next, next chapter—chapter 5) due to the two downward strokes 1908 and 1912. This outcome is represented by the new UI screen rendering 1918 on an instance of the eBook reader device 102(T2C), taken at a time T2.

The converse of the patterns results in chapter navigation toward earlier chapters in the book (if any). For instance, after the stroke 1904 to the anchor point 1906, the user may trace a vertically upward stroke to direct the eBook reader device 102(T1) to move to the preceding chapter (i.e., chapter 2). Alternatively, this action may be configured to move to the start of the current chapter (i.e., chapter 3).

Figure 20:
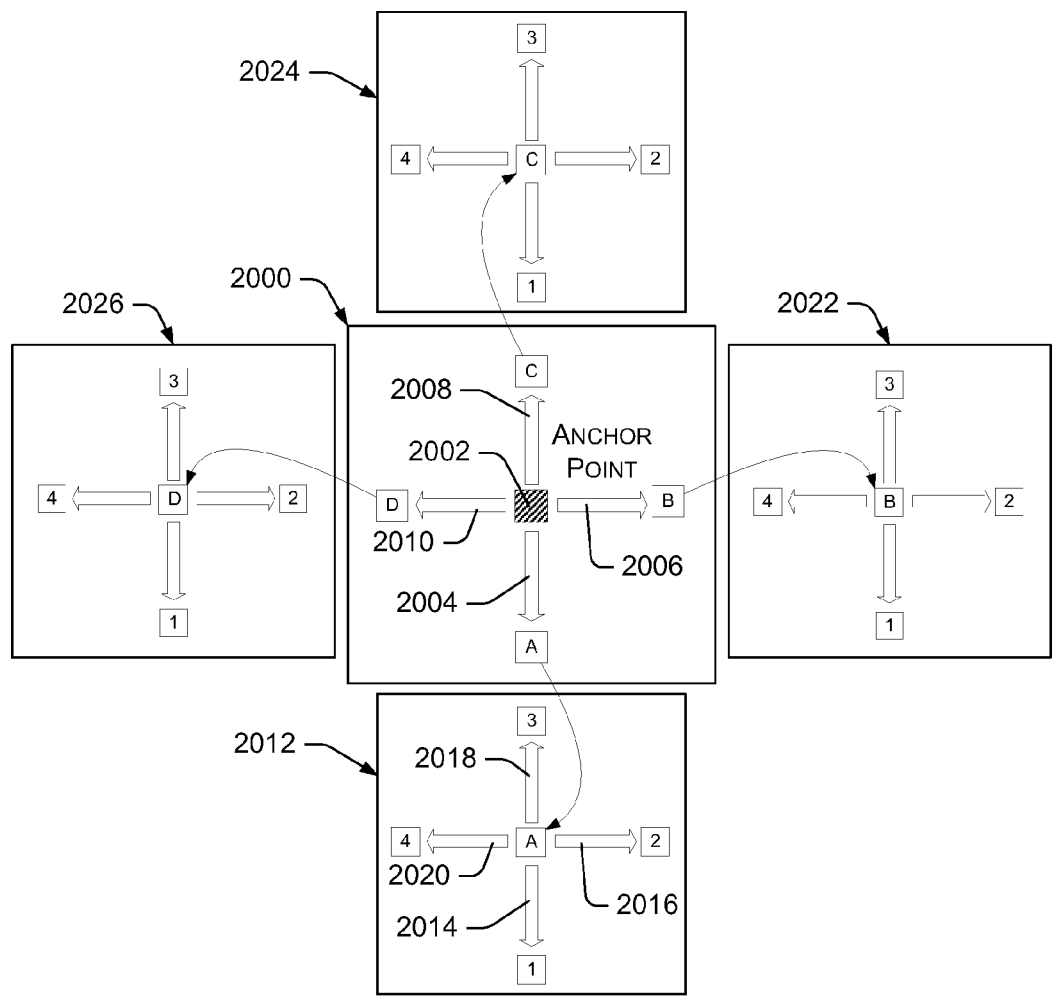
FIG. 20 shows a pattern formation that may be used to implement chapter navigation, and how the pattern may be cascaded for more navigation options.

FIG. 20 shows a basic pattern formation 2000 that may be used to implement chapter navigation and how the pattern formation 2000 may be cascaded to implement various navigation options, such as pattern 1902 in FIG. 19. The basic pattern formation 2000 includes an anchor point 2002 and four directional strokes that may be taken from the anchor point 2002: a downward stroke 2004 to point A, a rightward stroke 2006 to point B, an upward stroke 2008 to point C, and a leftward stroke 2010 to point D. The anchor point 2002 is a home position that initiates a chapter navigation operation. The anchor point 2002 is invoked by one or more various gestures, such as a press and hold, or a touch and slide for a certain distance. In the example of FIG. 19, the anchor point 1906 was reached via a horizontal leftward stroke 1904 of a certain distance.

Once in the chapter navigation pattern 2000, the four directional strokes 2004-2010 perform various navigation operations. In one implementation, the downward stroke 2004 directs the device to move to the next chapter, and the upward stroke 2008 directs the device to move to the preceding chapter (or start of the current chapter, depending upon configuration). The rightward stroke 2006 and the leftward stroke 2010 direct the device to move one page forward or one page backward, respectively. It is noted, however, that the strokes may perform other functions, such as skipping multiple chapters, or moving to the middle of a chapter, or invoking smaller navigation panels (like the panel 1704 shown in FIG. 17) for forward or backward chapter movement.

The chapter navigation pattern 2000 may be cascaded to implement more complex or sophisticated operations. For instance, once the user arrives at point A following the downward stroke 2004, the user may trace along any one of another set of four paths in the secondary pattern 2012. That is, from point A, the user may make one of four additional strokes to initiate further chapter navigation operations, including a downward stroke 2014 to point 1, a rightward stroke 2016 to point 2, an upward stroke 2018 to point 3, and a leftward stroke 2020 to point 4. These secondary strokes, when coupled with the first set of primary strokes in pattern 2000, direct the device to perform an additional operation. For instance, the combination of the primary downward stroke 2004 and the secondary downward stroke 2014 may be configured to direct the eBook reader device to move two chapters forward.

As shown in FIG. 20, other secondary patterns may be used at the end of each point in the primary pattern 2000. From point B, the user may make any of the four strokes in a secondary pattern 2022. Similarly, from points C and D, the user may make any of the four strokes in respective secondary patterns 2024 and 2026. In this manner, the pattern may be cascaded to form sequences of interleaved horizontal strokes and vertical strokes, where each set sequence may be interpreted as moving one or more chapters and/or one or more pages about those new chapters.

It is noted that pattern 2000 is merely one example pattern that may be used to implement chapter navigation on a touch-screen display 104. The example pattern 2000 is not intended to be limiting. Other patterns may be employed, such as an "X" shaped pattern, or other path shapes that have more or less than four stokes. Further, other results may be assigned to the various sequences of strokes.

Figure 21:
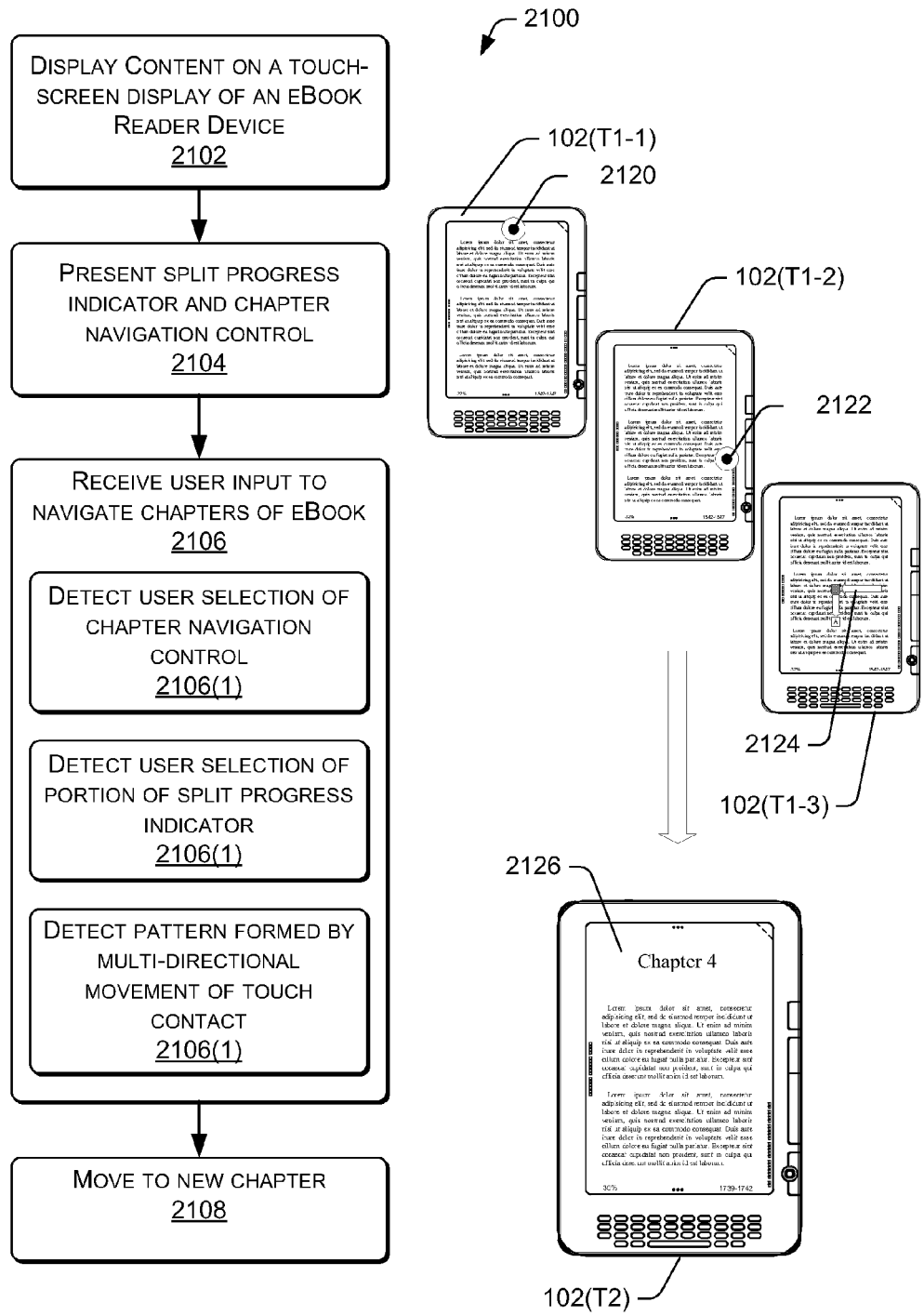
FIG. 21 is a flow diagram illustrating an exemplary process of using chapter navigation to move locations in the content item.

FIG. 21 shows an exemplary process 2100 of using chapter navigation to move locations in the content item. At 2102, content is displayed on a touch-screen display 104 of the eBook reader device 102. The content may be from an eBook, such text, graphics, tables, and the like.

At 2104, the split progress indicator and chapter navigation control are presented on the display 104 in conjunction with the content.

At 2106, user input via the touch-screen display is received to initiate chapter navigation. There are multiple ways to utilize the touch-screen user interface to facilitate chapter navigation. Three techniques are described for example purposes in FIG. 21. At 2106(1), the user may select the chapter navigation control 1702, such as that shown and described with reference to FIG. 17. This scenario is shown with the first instance of the device 102(T1-1) at time T1, where the user presses the control 1702 at the top of the display, as represented by the tap event 2120. Upon detection of this actuation, a table of contents is presented as shown in FIG. 17, allowing the user to select individual chapters to which to move.

At 2106(2), in another possible way to navigate chapters, the user may select a portion of the split progress indicator to move to a different chapter, as shown and described with reference to FIG. 18. This technique is represented in FIG. 21 where the user touches or selects a grouping of segments in the split progress indicator at the tap event 2122 on the second instance of the device 102(T1-2).

At 2106(3), in yet another possible way to navigate chapters, the device may detect a pattern traced on the touch-screen display. One example set of patterns is shown and described above with respect to FIGS. 19 and 20. This technique is shown in FIG. 21 by the pattern 2124 traced on a third instance of the device 102(T1-3).

At 2108, following any one of these navigation techniques, the device moves the content to a new chapter. This is represented by the new page 2126 (i.e., chapter 4) being shown on the display of the device 102(T2) at a time T2 after the user input in any of the acts 2106(1)-(3).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computer-implemented method comprising:
under control of an electronic book reader device configured with specific executable instructions,
displaying, in a first mode of the electronic book reader device, a current page of an electronic book on a touch-screen display of the electronic book reader device, wherein bookmark navigation is disabled in the first mode;
detecting user input to the touch-screen display, wherein the user input comprises a touch gesture followed by a first stroke;
transitioning the electronic book reader device from the first mode to a second mode of operation based at least in part on detecting the user input, wherein bookmark navigation is enabled in the second mode;
determining that the first stroke is performed in a first direction;
depicting on the touch-screen display, based at least in part on the first stroke, a collection of bookmark icons comprising a first plurality of bookmark icons associated with the electronic book, each individual bookmark icons of the first plurality of bookmark icons corresponds to one or more preceding pages relative to the current page of the electronic book;
receiving user selection of a particular bookmark icon from the first plurality of bookmark icons; and temporarily displaying a second page of the electronic book on the touch screen display, the second page being associated with a bookmark represented by the particular bookmark icon.

2. The computer-implemented method of claim 1, wherein the touch gesture originates in an upper right-hand corner of the touch-screen display.

3. The computer-implemented method of claim 1, wherein depicting the collection of bookmark icons comprises arranging the collection of bookmark icons horizontally across a top portion of the touch-screen display.

4. The computer-implemented method of claim 1, wherein depicting the collection of bookmark icons comprises arranging the collection of bookmark icons vertically along a right side of the touch-screen display.

5. The computer-implemented method of claim 1, wherein depicting the collection of bookmark icons comprises arranging a first portion of the collection of bookmark icons horizontally across a top portion of the touch-screen display and a second portion of the collection of bookmark icons vertically along a right side of the touch-screen display.

6. The computer-implemented method of claim 1, further comprising:
    detecting second user input comprising the touch gesture followed by a second stroke in a second direction that is different from the first direction; and
    depicting, on the touch-screen display, a second plurality of bookmark icons of the collection of bookmark icons associated with the electronic book, wherein individual bookmarks of the second plurality of bookmark icons correspond to one or more subsequent pages relative to the current page of the electronic book.

7. The computer-implemented method of claim 1, further comprising shifting a portion of content from the second page relative to the touch-screen display in response to user contact with the touch-screen display.

8. The computer-implemented method of claim 1, further comprising, responsive to user selection of a second particular bookmark icon, displaying a third page of the electronic book on the touch-screen display, the third page being associated with another bookmark represented by the second particular bookmark icon.

9. The computer-implemented method of claim 1, further comprising depicting a split progress indicator in conjunction with the current page, the split progress indicator having a first portion in a first region of the touch-screen display to represent an amount of content that comes before the current page and a second portion in a second region of the touch-screen display to represent an amount of content that comes after the current page.

10. The computer-implemented method of claim 9, further comprising adjusting the first and second portions of the split progress indicator in response to displaying the second page, such that the first portion in the first region of the touch-screen display is updated to represent an amount of content that comes before the second page and the second portion in the second region of the touch-screen display is updated to represent an amount of content that comes after the second page.

11. The computer-implemented method of claim 1, further comprising:
    transitioning the electronic book reader device from the first mode to a chapter navigation mode in response to a directional swiping gesture that includes pausing and changing direction at an anchor point, the anchor point used to separate a page navigation gesture from a chapter navigation gesture.

12. The computer-implemented method of claim 1, further comprising:
    transitioning from the first mode to a third mode in response to detecting second user input;
    based at least partly on detecting a vertical stroke, moving from a current chapter to a next chapter or a previous chapter of the electronic book;
    based at least partly on detecting a downward vertical stroke, advancing one chapter toward an end of the electronic book;
    based at least partly on detecting an upward vertical stroke, moving one chapter toward a beginning of the electronic book;
    based at least partly on detecting a left-to-right stroke, moving a single page forward in the electronic book; and
    based at least partly on detecting a right-to-left motion, moving a single page backward in the electronic book.

13. A computer-implemented method comprising:
    under control of an electronic book reader device configured with specific executable instructions,
    displaying, in a first mode of the electronic book reader device, a page of an electronic book on a display of the electronic book reader device, the first mode not enabling bookmark navigation;
    receiving user input comprising a first stroke;
    transitioning the electronic book reader device from the first mode to a second mode in which one or more bookmark indicia are presented on the display for enabling bookmark navigation within the electronic book;
    determining that the first stroke is performed in a first direction; and
    displaying, based at least in part on the first stroke performed in the first direction, one or more bookmarks, wherein individual bookmarks of the one or more bookmarks are associated with one or more subsequent pages relative to the page of the electronic book.

14. The computer-implemented method of claim 13, further comprising:
    depicting a split progress indicator in conjunction with the page, the split progress indicator having a first portion in a first region of the display to represent an amount of content that comes before the page and a second portion in a second region of the display to represent an amount of content that comes after the page, the first region being separate from the second region; and
    responsive to movement through the electronic book from the page to a second page, adjusting both the first and second portions of the split progress indicator,
    wherein the first region is located on a left side of the display and the second region is located on a right side of the display.

15. The computer-implemented method of claim 14, wherein the first and second portions are arranged vertically along opposing sides of the display.

16. The computer-implemented method of claim 14, wherein the first portion of the split progress indictor grows taller and the second portion of the split progress indictor shrinks smaller as the electronic book is read from front to back, and the first portion of the split progress indictor shrinks smaller and the second portion of the split progress indictor grows taller as the electronic book is read from back to front.

17. The computer-implemented method of claim 14, wherein the first region is located at a top of the display and the second region is located at a bottom of the display.

18. The computer-implemented method of claim 14, wherein the first and second portions are arranged horizontally along a top and bottom of the display.

19. The computer-implemented method of claim 14, wherein the first and second portions are arranged linearly on a common line along a bottom or a top of the display, with a distance between the first and second portions to provide separation.

20. The computer-implemented method of claim 14, wherein the first and second portions of the split progress indicator are composed of one or more segments, wherein:
   individual segments of the one or more segments represent a predetermined amount of content in the electronic book; and
   the one or more segments are further grouped according to at least one of:
   corresponding sections of the electronic book; or
   user interactions with the electronic book, including according to one of annotations, bookmarks, or highlights.

21. The computer-implemented method of claim 20, wherein each of the one or more segments are approximately equal in size.

22. The computer-implemented method of claim 13, further comprising:
   receiving second user input comprising a second stroke in a second direction that is different from the first direction; and
   displaying, based at least in part on the second stroke in the second direction, one or more additional bookmarks, wherein individual bookmarks of the one or more additional bookmarks are associated with one or more preceding pages relative to the page of the electronic book.

23. The computer-implemented method of claim 14, further comprising initiating a chapter navigation operation based at least in part on detecting second user input comprising a pattern traced onto the display, the pattern including a sequence of non-linear strokes that are made contiguously.

24. A computer-implemented method comprising:
   displaying, in a normal mode of an electronic device, in which page-to-page navigation is enabled, a first page of an electronic book on a touch-screen display;
   detecting first user input comprising a gesture that pauses and changes direction at an anchor point that separates page navigation gestures from chapter navigation gestures;
   transitioning to a chapter navigation mode in which a subsequent gesture causes navigation to a chapter start location based at least partly on detecting the first user input;
   detecting second user input;
   transitioning from the chapter navigation mode to the normal mode based at least partly on the second user input;
   detecting third user input comprising a touch and a slide;
   transitioning from the normal mode to a bookmark navigation mode;
   determining that the slide is performed in a first direction; and
   displaying, based at least in part on the slide in the first direction, one or more bookmarks, wherein individual bookmarks of the one or more bookmarks are associated with one or more preceding pages relative to the page.

25. The computer-implemented method of claim 24, further comprising:
   in the chapter navigation mode:
   based at least partly on detecting a vertical stroke, navigating from a current chapter to a next chapter or a previous chapter of the electronic book;
   based at least partly on detecting a downward vertical stroke, navigating one chapter toward an end of the electronic book;
   based at least partly on detecting an upward vertical stroke, navigating one chapter toward a beginning of the electronic book;
   based at least partly on detecting a left-to-right stroke, navigating a single page forward in the electronic book; and
   based at least partly on detecting a right-to-left motion, navigating a single page backward in the electronic book.

26. The computer-implemented method of claim 24, further comprising:
   displaying, in the normal mode of the electronic device, a split progress indicator in conjunction with the first page of the electronic book, wherein:
   the split progress indicator comprises a first portion and a second portion that together indicate user progress through the electronic book;
   the first portion is in a first region of the touch-screen display to represent an amount of content that comes before the first page; and
   the second portion is in a second region of the touch-screen display to represent an amount of content that comes after the first page, the first region being separate from the second region.

27. The computer-implemented method of claim 26, further comprising:
   determining that the slide is performed in a second direction that is different from the first direction; and
   displaying, based at least in part on the slide in the second direction, one or more additional bookmarks, wherein individual bookmarks of the one or more additional bookmarks are associated with one or more subsequent pages relative to the page.

28. An electronic book reader device, comprising:
   a processor;
   a memory accessible by the processor;
   a touch-screen display to present a visible representation of an electronic book; and
   instructions stored in the memory, the instructions executable by the processor to perform acts comprising:
   presenting a graphical user interface that facilitates user navigation through the electronic book;
   transitioning from a normal mode to a chapter navigation mode based at least partly on detecting a first user input performed at an anchor point on the touch-screen display, the anchor point distinguishing between a page navigation and chapter navigation;
   navigating from a current chapter to a next chapter or a previous chapter of the electronic book based at least partly on detecting at least one subsequent input gesture in the chapter navigation mode;
   transitioning from the chapter navigation mode to the normal mode based at least partly on detecting a second user input;
   transitioning from the normal mode to a bookmark navigation mode based at least partly on detecting a third user input that includes a directional slide; and
   displaying, based at least in part on the directional slide, one or more bookmarks in the bookmark navigation mode, wherein individual bookmarks of the one or more bookmarks are associated with one or more subsequent pages relative to a current page of the electronic book.

29. The electronic book reader device of claim 28, the acts further comprising:
 in the bookmark navigation mode:
  displaying a first set of one or more graphical icons representing the one or more bookmarks;
  responsive to user selection of one of the one or more graphical icons via the touch-screen display, transitioning from the current page to a bookmarked page, wherein the first set of one or more graphical icons is arranged along a first side of the touch-screen display.

30. The electronic book reader device of claim 29, wherein, responsive to user selection of a particular graphical icon via the touch-screen display, instructing the touch-screen display to present another page of the electronic book associated with a bookmark corresponding to the particular graphical icon.

31. The electronic book reader device of claim 28, the acts further comprising:
 navigate one chapter toward an end of the electronic book in response to detecting a downward vertical stroke,
 navigate one chapter toward a beginning of the electronic book in response to detecting an upward vertical stroke,
 navigate a single page forward in the electronic book in response to detecting a left-to-right stroke, and
 navigate a single page backward in the electronic book in response to detecting a right-to-left motion.

32. An electronic device comprising:
 a touch-screen display to present a digital content item;
 a processor;
 a memory accessible by the processor; and
 one or more program modules stored in the memory and configured to be executed by the processor, the one or more program modules including instructions for:
  displaying, in a normal mode of the electronic device, a portion of the digital content item, wherein the normal mode disables use of bookmarks for navigation;
  receiving mode selection user input;
  transitioning, based at least partly on the mode selection user input, from the normal mode to a bookmark navigation mode to enable bookmark navigation to a bookmarked location in a digital content item;
  determining that the mode selection user input includes a swipe in a first direction;
  displaying, in the bookmark navigation mode and based at least in part on the swipe in the first direction, a plurality of bookmark icons, wherein individual bookmark icons of the plurality of bookmark icons correspond to one or more pages subsequent to a current location in the digital content item;
  receiving a user selection of a bookmark icon from the plurality of bookmark icons displayed on the touch-screen display;
  receiving a user selection of the bookmark icon, temporarily displaying a second page of the digital content item while the bookmark icon is selected; and
  based, at least in part on detecting, on the touch-screen display, additional user input comprising, a pattern that includes a sequence of non-linear strokes that are made contiguously, initiating a chapter navigation operation.

33. The electronic device of claim 32, the one or more program modules further including instructions for:
 displaying a split progress indicator having first and second portions that together indicate user progress through the digital content item; and
 responsive to movement through the digital content item, adjusting both the first and second portions of the split progress indicator, wherein the first portion is provided in a first region of the display to represent an amount of content that comes before a current location in the digital content item and the second portion is provided in a second region of the display to represent an amount of content that comes after the current location, the first region being separate from the second region.

34. The electronic device of claim 33, wherein the first portion is arranged vertically along a left side of the display and the second portion is arranged vertically along a right side of the display.

35. The electronic device of claim 33, wherein the first and second portions of the split progress indicator are composed of one or more distinct segments, where each segment represents a predetermined amount of content in the digital content item.

36. The electronic device of claim 33, wherein the one or more program modules further include instructions for:
 responsive to navigating to a particular bookmark, adjusting both the first and second portions of the split progress indicator.

37. A computer-readable storage medium having stored therein instructions, which when executed by an electronic device, cause the electronic device to perform acts comprising:
 presenting, in a normal mode that does not provide bookmark navigation or chapter navigation, a first part of a digital content item on a display device;
 transitioning from the normal mode to a bookmark navigation mode of operation based at least partly on detecting a first user input performed on a touch-screen display, the bookmark navigation mode depicting one or more graphical bookmark icons, wherein selection of a particular graphical bookmark icon of the one or more graphical bookmark icons causes a second part of the digital content item to be displayed, the second part of the digital content item associated with the particular graphical bookmark icon;
 displaying, based at least in part on a direction of a slide included in the first user input, one or more bookmarks in the bookmark navigation mode, wherein individual bookmarks of the one or more bookmarks correspond to one or more preceding pages relative to a current page of the digital content item;
 transitioning from the bookmark navigation mode to the normal mode; and
 transitioning from the normal mode to a chapter navigation mode in response to detecting a second user input performed on the touch-screen display.

38. The computer-readable storage medium of claim 37, wherein the electronic device comprises an electronic book reader device and the digital content item comprises an electronic book.

39. The computer-readable storage medium of claim 37, wherein the digital content item comprises one of an electronic book, an audio item, a video item, or a multimedia item.

40. The computer-readable storage medium of claim 37, the acts further comprising:
 displaying a split progress indicator having a first portion to proportionally represent an amount of content that comes before the part of the digital content item being presented in a region of the display and a second portion to proportionally represent an amount of content that comes after the part of the digital content item being presented in the region, wherein the graphical bookmark icons include a first set of icons to represent bookmarks associated with content coming before the part of the digital content item being presented in the region, and a second set of icons to represent bookmarks associated with content coming after the part of the digital content item being presented in the region.

41. The computer-readable storage medium of claim 37, wherein:
the digital content item comprises an electronic book; and
in the chapter navigation mode:
- a vertical stroke moves from a current chapter to a next chapter or a previous chapter of the electronic book;
- a downward vertical stroke advances one chapter toward an end of the electronic book;
- an upward vertical stroke moves one chapter toward a beginning of the electronic book;
- a left-to-right stroke moves a single page forward in the electronic book; and
- a right-to-left motion moves a single page backward in the electronic book.

* * * * *